United States Patent
Kitanaka

(10) Patent No.: US 7,991,520 B2
(45) Date of Patent: Aug. 2, 2011

(54) CONTROL APPARATUS FOR ELECTRIC CAR

(75) Inventor: Hidetoshi Kitanaka, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 688 days.

(21) Appl. No.: 12/067,564

(22) PCT Filed: Apr. 25, 2006

(86) PCT No.: PCT/JP2006/308638
§ 371 (c)(1),
(2), (4) Date: Mar. 20, 2008

(87) PCT Pub. No.: WO2007/129365
PCT Pub. Date: Nov. 15, 2007

(65) Prior Publication Data
US 2009/0271056 A1   Oct. 29, 2009

(51) Int. Cl.
*G05D 3/00* (2006.01)
*G06F 7/00* (2006.01)
(52) U.S. Cl. .............................. 701/22; 701/36; 320/140
(58) Field of Classification Search .................... 701/22, 701/33, 36; 320/140, 143, 166
See application file for complete search history.

(56) References Cited

U.S. PATENT DOCUMENTS 7,667,342 B2 * 2/2010 Matsumoto et al. ........ 290/40 C
7,816,786 B2 * 10/2010 Nakatsu et al. ................ 257/714

FOREIGN PATENT DOCUMENTS

| JP | 61-185201 U | 11/1986 |
|---|---|---|
| JP | 62-071402 | 4/1987 |
| JP | 2-219401 A | 9/1990 |
| JP | 05-115101 | 5/1993 |
| JP | 2003-018702 | 1/2003 |
| JP | 2003-199204 A | 7/2003 |
| JP | 2004-056934 | 2/2004 |
| JP | 2006-014395 A | 1/2006 |

OTHER PUBLICATIONS

Form PCT/ISA/210 (International Search Report) dated Aug. 8, 2006.

* cited by examiner

*Primary Examiner* — Gertrude Arthur Jeanglaud
(74) *Attorney, Agent, or Firm* — Buchanan Ingersoll & Rooney PC

(57) ABSTRACT

In a control apparatus for an electric car, wherein an auxiliary power source device, a drive control device and a power storage system are connected in parallel; the power storage system is configured of a DC-DC converter in parallel with which a capacitor is connected, a power storage portion, and a power storage system control portion which performs the controls of the DC-DC converter and the power storage portion, and the power storage system control portion is configured so as to be capable of detecting the service interruption and grounding of an overhead line.

21 Claims, 13 Drawing Sheets

CONTROL APPARATUS FOR ELECTRIC CAR

TECHNICAL FIELD

The present invention relates to a control apparatus for an electric car as applies a power storage system that absorbs and emits DC power.

BACKGROUND ART

In recent years, there have been made developments in each of which a power storage system that uses a power storage device such as a secondary battery or an electric double layer capacitor is applied to a control apparatus for an electric car, and it has been known that kinetic energy possessed by the vehicle can be effectively utilized owing to a configuration in which excess regenerative power generated in the regenerative braking mode of the vehicle is stored and in which the stored power is used in the powering acceleration mode (in, for example, Patent Document 1).
Patent Document 1: JP-A-2006-14395

DISCLOSURE OF THE INVENTION

Problems that the Invention is to Solve

In the electric car applying the power storage system, there is the problem that, even in a case where the electric power of an overhead line is to be intentionally suspended, the suspension of the electric power becomes impossible, for such a reason that when the power storage system continues its running on the occasion of an overhead-line service interruption at the intentional stop of power feed to the overhead line by a substation, at the disconnection of the overhead line, or at the like, the power storage system reversely applies a voltage to the overhead line, so an electric shock is apprehended on the occasion of touch with the overhead line on account of a work or the like.

Besides, there is the problem that, when the overhead line has undergone a grounding fault, the power storage system continues to feed current to a grounded place, so the damage of the grounded place is enlarged.

At the overhead-line service interruption or at the overhead-line grounding, accordingly, it is necessary to quickly detect the service interruption or the grounding and to reliably stop the power storage system. Besides, in a case where the vehicle is caused to travel to the nearest station by the electric power of the power storage system on the occasion of, for example, the occurrence of the service interruption in the overhead line, the power storage system needs to be effectively operated while avoiding the reverse application of a voltage to the overhead line by this power storage system.

Patent Document 1 mentioned above indicates that a power-reception prohibition detector is disposed in a control apparatus for an electric car applying a power storage system, whereby the switch of the control apparatus for the electric car, in which the power storage system is installed, is opened in a case where a power-reception prohibited state has been detected. However, a concrete method for detecting the power-reception prohibited state and the concrete configuration of the control portion of the power storage system are not indicated.

The present invention provides a control apparatus for an electric car applying a power storage system, including a control portion which is so configured that, in a case where the electric car travels by exchanging electric power with an overhead line (hereinbelow, written as the "current-collection travel mode"), an overhead-line service interruption and overhead-line grounding are detected to quickly stop the power storage system, so the reverse application of a voltage to the overhead line can be avoided, and that, in a case where the electric car travels without exchanging the electric power with the overhead line (hereinbelow, written as the "independent travel mode"), an auxiliary power source device and a drive control device can be stably run while avoiding the reverse application of the voltage to the overhead line.

Means for Solving the Problems

In a control apparatus for an electric car as includes a drive control device and an auxiliary power source device in parallel with which a power storage system is connected, the power storage system is configured of a DC-DC converter in parallel with which a capacitor is connected, a power storage portion, and a power-storage-system control portion which performs the controls of the DC-DC converter and the power storage portion, and the power-storage-system control portion is configured so as to be capable of detecting the service interruption and grounding of an overhead line.

BEST MODE FOR CARRYING OUT THE INVENTION

Embodiment 1

FIG. 1 is a diagram showing a configurational example of a control apparatus for an electric car in Embodiment 1 of the present invention.

As shown in FIG. 1, the control apparatus is so configured that a substation 1 which is configured of a voltage source 1a and a switch 2 is connected to an overhead line 3 and a rail 21, whereby the electric car can accept electric power from the overhead line 3 through a current collector 20 and a wheel 22. A general switch 40 exists at a stage succeeding to the current collector 20, and an auxiliary power source device 51 to which a load 52 is connected, a drive control device 60 to which a driving motor 65 is connected, and a power storage system 70 are connected in parallel, at a stage succeeding to the general switch 40. Incidentally, a diode 50 is a counter-flow preventive diode which is disposed as may be needed.

Besides, the auxiliary power source device 51, the drive control device 60 and the power storage system 70 are sometimes mounted on the electric car as devices which are separate from one another, whereas they are sometimes mounted on the electric car as a device or devices in which any of them are unitarily combined, and they are subjects to be handled in the invention, in either case.

Incidentally, as shown in the figure, the input power of the auxiliary power source device 51 is denoted by PA (the input current by IA), and regarding the sense thereof, a direction in which the power flows into the auxiliary power source device 51 is made plus. Besides, the input power of a drive control inverter 64 is denoted by PT (the input current by IT), and regarding the sense thereof, a direction in which the power flows into the drive control inverter 64 is made plus. Further, the input power of the power storage system 70 is denoted by PS (the input current by IS), and regarding the sense thereof, a direction in which the power flows out of the power storage system is made plus.

The drive control device 60 is configured of a voltage detector 66a for detecting an input voltage VT1, a switch 61, a reactor 62, a capacitor 63, a voltage detector 66b for detecting the voltage VT2 of the capacitor, the drive control inverter 64, and a drive control portion 600. Besides, the power storage system 70 is configured of a voltage detector 76a for detecting an input voltage VS1, a switch 71, a capacitor 73, a voltage detector 76b for detecting the voltage VS2 of the capacitor, a DC-DC converter 74, a power storage portion 75, and a power-storage-system control portion 700. Incidentally, the input side of the power storage system 70 has its plus side connected to the plus side of the capacitor 63 of the drive control device 60 and has its minus side connected to the wheel 22.

Incidentally, the plus side may well be connected to the stage succeeding to the general switch 40, but in this case, a separate reactor (not shown) is required between the switch 71 and the capacitor 73 just as in the configuration of the drive control device 60. However, this measure is unfavorable for the reason that the change rates of currents which the power storage system absorbs and emits are limited by the reactor, so a response performance degrades.

Besides, it is also allowed to employ a configuration in which the switch 71 and the capacitor 73 are respectively shared with the switch 61 and the capacitor 63 of the drive control device 60 (that is, a configuration in which the switch 71 and the capacitor 73 are omitted, and in which the input of the DC-DC converter 74 is connected across the capacitor 63 of the drive control device 60). However, in a case, for example, where the DC-DC converter 74 has become faulty, it cannot be detached from the drive control device 60, so also the drive control device 60 needs to be stopped, to incur the problem that the travel of the electric car becomes impossible. It is therefore favorable to employ the configuration of FIG. 1 in which the switch 71 and the capacitor 73 are disposed so that, in the case of the fault of the DC-DC converter 74, or the like, the power storage system 70 may be detached from the drive control device 60 so as to permit the travel of the electric car by exploiting the drive control device 60.

In addition to the input voltage VT1 and the capacitor voltage VT2, the input current IT and the rotational frequency FM of the driving motor 65 are, at least, inputted to the drive control portion 600, and an acceleration command, a braking command, and the magnitudes thereof are, at least, inputted thereto from outside, though no illustration is made.

Incidentally, the rotational frequency FM of the driving motor 65 can also be calculationally evaluated by the drive control portion 600, and the calculational value may well be used. Besides, the acceleration command, the braking command, and the magnitudes thereof are set by the manipulations of a motorman in some cases, and they are inputted from an automatic running system not shown, or the like in the other cases.

Besides, a state signal CV from the drive control portion 600 as includes, at least, the input voltage VS1, the capacitor voltage VS2, the power PS (or the current IS), the power PA (or the current IA) of the auxiliary power source device 51, the power PT (or the current IT) of the drive control inverter 64, the rotational frequency FM of the driving motor 65, an inverter frequency FINV, and a vehicle speed VB are inputted to the power-storage-system control portion 700, and a running command C2 which includes a current-collection travel mode command or an independent travel mode command is inputted from outside.

Incidentally, the "current-collection travel mode command" is a command which is set in a case where the electric car travels while exchanging the electric power with the substation 1. The "independent travel mode command" is a command which is set in a case where the electric car travels using only the electric power from the power storage system 70 without exchanging the electric power with the substation 1, and there is supposed, for example, a case where the electric car travels to the nearest station with only the electric power of the power storage system 70 on the occasion of the overhead-line service interruption. Regarding the settings of these signals, there are considered a case where they are performed by the motorman, a case where they are performed by a central command center (not shown) or any other system of the vehicle (for example, the automatic running device not shown), and so forth.

A disconnected place 10 having occurred in the overhead line 3, and a grounding path 11 are further shown in FIG. 1. In the ensuing description, in case of describing the case where the service interruption of the overhead line has occurred, there will be supposed a case where the switch 2 of the substation 1 has been opened or where the overhead line 3 has been disconnected in the disconnected place 10. Besides, in case of describing a case where the grounding of the overhead line has occurred, there will be supposed a case where the overhead line is grounded to the rail through the grounding path 11.

Incidentally, description will be made supposing that the disconnected place 10 and the grounding path 11 do not exist in the ordinary state of the overhead line.

Next, there will be described a configurational example of the power-storage-system control portion 700 forming the nucleus of the invention.

Incidentally, the configuration will be described in conjunction with a block diagram below, and respective contents may be configured either by H/W or by S/W.

FIG. 2 is a diagram showing the configurational example of the power-storage-system control portion 700 in Embodiment 1 of the invention.

By the way, in the figures of FIG. 2, et seq., electric powers and currents are jointly expressed as PT (or IT), PA (or IA), PS (or IS), PL (or IL) and PO* (or IO*). This is intended to jointly express on the same figures, a case where a control system is configured using the electric power PA of the auxiliary power source device 51, the electric power PT of the drive control inverter 64, the electric power PL which is the sum of the electric powers PA and PT, and the electric power PS of the power storage system 70, and a case where a control system is configured using the current IA of the auxiliary power source device 51, the current IT of the drive control inverter 64, the current IL which is the sum of the currents IA and IT, and the current IS of the power storage system 70. When the control system is configured by either of the methods, similar advantages are attained in the invention.

In the ensuing description, however, there will be supposed the case where the control system is configured using the electric power PA, electric power PT, electric power PL and electric power PS.

In the case where the control system is configured using the current IA, current IT, current IL and current IS, the electric power PA may be substituted by the current IA, the electric power PT by the current IT, the electric power PL by the current IL, and the electric power PS by the current IS, and the output of an absorption/emission command generation portion 720 may be changed from the basic power command PO* to the basic current command IO*, in the ensuing description.

As shown in FIG. 2, the power-storage-system control portion 700 is configured of a command reception and distribution portion 710a, a command reception and distribution portion 710b, the absorption/emission command generation portion 720, a DC-DC converter current command generation portion 730(1) or 730(2), a voltage command generation portion 750, a voltage sudden decrease detection portion 760, a low voltage detection portion 770, an overvoltage detection portion 780, a logical sum circuit 790, and a DC-DC converter control portion 740.

The command reception and distribution portion 710a receives the running command C2 including a plurality of commands, from outside, and it is so configured that, in a case where the current-collection travel mode command or the independent travel mode command is contained in the content of the running command C2, a control mode command CMC corresponding to the mode command is inputted to the DC-DC converter current command generation portion 730(1). The command reception and distribution portion 710b receives the state signal CV including a plurality of commands, from the drive control portion 600, and it is so configured that the rotational frequency FM of the driving motor 65, or the inverter frequency FINV and the vehicle speed VB is/are extracted from within the state signal CV and inputted to the absorption/emission command generation portion 720.

The absorption/emission command generation portion 720 is so configured that the electric power PL which is the sum between the electric power PT of the drive control inverter and the electric power PA of the auxiliary power source device 51, and the rotational frequency FM of the driving motor 65, or the inverter frequency FINV and the vehicle speed VB is/are inputted thereto, and that it inputs the basic power command PO* to the DC-DC converter current command generation portion 730(1). The voltage command generation portion 750 is so configured as to generate a second voltage command VS2B* being the command (target value) of the voltage VS2 of the capacitor 73, and to input the command VS2B* to the DC-DC converter current command generation portion 730(1).

The DC-DC converter current command generation portion 730(1) is so configured that the basic power command PO*, the second voltage command VS2B*, the electric power PS of the power storage system 70, the voltage VS2 of the capacitor 73, and the control mode command CMC are inputted thereto, and that it outputs a DC-DC converter current command IDD* to the DC-DC converter control portion 740. The DC-DC converter control portion 740 is so configured as to execute a current control in order that the current of the DC-DC converter 74 may agree with the DC-DC converter current command IDD*.

FIG. 3 is a diagram showing circuit configuration examples of the DC-DC converter 74 in Embodiment 1 of the invention.

FIG. 3(a) shows the example which employs a bidirectional step-up/step-down type DC-DC converter circuit 74(1), and which is configured of switching elements 74a-74d, a coupling reactor 74e, a capacitor 74f and a reactor 74g. Besides, FIG. 3(b) shows the example which employs a bidirectional step-down type DC-DC converter circuit 74(2), and which is configured of switching elements 74h and 74i and a reactor 74j.

Incidentally, the parts of currents IDD which are controlled by the DC-DC converter control portion 740 are shown in FIGS. 3(a) and 3(b). The current IDD of the coupling reactor 74e and the current IDD of the reactor 74j are respectively suitable, but currents in other places may well be controlled.

Referring back to FIG. 2, the voltage sudden decrease detection portion 760 is so configured that the voltage VS2 of the capacitor 73 is inputted thereto, and that it inputs a voltage sudden decrease detection signal VD to the logical sum circuit 790. Likewise, the low voltage detection portion 770 is so configured that the voltage VS2 of the capacitor 73 is inputted thereto and that it inputs a low voltage detection signal LV to the logical sum circuit 790, and the overvoltage detection portion 780 is so configured that the voltage VS2 of the capacitor 73 is inputted thereto and that it inputs an overvoltage detection signal OV to the logical sum circuit 790.

The logical sum circuit 790 takes the logical sum of the voltage sudden decrease detection signal VD, low voltage detection signal LV and overvoltage detection signal OV and inputs the result to the DC-DC converter control portion 740 as a converter stop command COF, and it outputs switch opening commands SOF and SOF1 to the switches 61 and 71 and the general switch 40. Incidentally, although no illustration is made, the output of the logical sum circuit 790 is so configured that, once it has changed to a high level, the status thereof is latched, and that the status thereof is kept until it is separately reset.

Next, there will be described configurational examples of the absorption/emission command generation portion 720, the DC-DC converter current command generation portion 730(1), the current sudden decrease detection portion 760, the low voltage detection portion 770 and the overvoltage detection portion 780.

FIG. 4 is a diagram showing the configurational example of the absorption/emission command generation portion 720. As shown in FIG. 4, a power burden proportion command PDP* which can be changed in accordance with the rotational frequency FM of the driving motor 65 or the inverter frequency FINV and the vehicle speed VB is generated by a power burden proportion command generation portion 723a.

Incidentally, the power burden proportion command PDP* may well be so configured as to be variable with the voltage VS2 of the capacitor 73, the temperature of the DC-DC converter 74, and the voltage, current, stored power quantity, temperature, etc. of the power storage portion 75. The absorption/emission command generation portion 720 is so configured as to take the product between the electric power PL and the command PDP* by a multiplier 724, and to output the product as the basic power command PO*. The power burden proportion command PDP* has any desired value of 0 to 1. A value smaller than 1, for example, about 0.9 is favorable for obtaining the advantages of the invention. Incidentally, the electric power PA of the auxiliary power source device 51 is slight, so that the advantages of the invention are not seriously spoilt even when the electric power PA is neglected or supposed to be zero.

Important is that the magnitude of the electric power PS which the power storage system 70 absorbs or emits, and the magnitude of the electric power PL which is the sum between the electric power PT of the drive control inverter 64 and the electric power PA of the auxiliary power source device 51 are maintained so as not to agree, and that electric power PP which becomes excessive or deficient is intentionally generated at all times, so as to exchange the electric power PP with the substation 1.

Accordingly, as long as the above purpose can be achieved, the configuration of the absorption/emission command generation portion 720 is not restricted to the configuration illustrated in FIG. 4.

Incidentally, description will be made concerning a case where the magnitude of the electric power PS which the power storage system 70 absorbs or emits is maintained to be smaller than the magnitude of the electric power PL which is the sum between the electric power PT of the drive control inverter 64 and the electric power PA of the auxiliary power source device 51, but the magnitude of the electric power PS which the power storage system 70 absorbs or emits may well be maintained to be larger than the magnitude of the electric power PL which is the sum between the electric power PT of the drive control inverter 64 and the electric power PA of the auxiliary power source device 51.

FIG. 5 is a diagram showing the configurational example of the DC-DC converter current command generation portion 730(1). As shown in FIG. 5, the DC-DC converter current command generation portion 730(1) includes a subtracter 731a which takes the difference between the basic power command PO* and the electric power PS that the power storage system absorbs or emits, a proportional-integral controller 732a which is located at a stage succeeding to the subtracter 731a, an adder 734 which adds the output of the proportional-integral controller 732a and the voltage VS2 of the capacitor 73, and a voltage limiter 733a1 which limits the upper and lower limits of the output of the adder 734 to a voltage upper-limit set value VLMTH and a voltage lower-limit set value VLMTL, and which outputs the limited output as a first voltage command VS2A*.

Besides, the DC-DC converter current command generation portion 730(1) includes a switch 735 by which the second voltage command VS2B* inputted from the voltage command generation portion 750 and the first voltage command VS2A* are changed-over in accordance with the control mode command CMC, a subtracter 731b which subtracts the voltage VS2 of the capacitor 73 from the output of the switch 735, a proportional-integral controller 732b which is located at a stage succeeding to the subtracter 731b, and a current limiter 733b which is located at the output of the proportional-integral controller 732b, which limits the upper and lower limits of the output of the controller 732b to a current upper-limit set value ILMTH and a current lower-limit set value ILMTL, and which outputs the limited output as the DC-DC converter current command IDD*. Incidentally, the switch 735 is so configured as to be changed-over onto the side of the first voltage command VS2A* in a case where the control mode command CMC instructs the current-collection travel mode, and to be changed-over onto the side of the second voltage command VS2B* in a case where the control mode command CMC instructs the independent travel mode.

Next, the operation of the DC-DC converter current command generation portion 730(1) will be described. Incidentally, the operation to be described below is an operation in the ordinary state where the overhead line is not under the service interruption. An operation in the case where the overhead line has undergone the service interruption will be described in due course.

(1) Current-Collection Travel Mode (State where the Switch 735 has been Changed-Over onto the Side of the First Voltage Command VS2A*)

In the powering acceleration mode of the electric car, assuming a case where the electric power PS emitted by the power storage system is large relative to the basic power command PO* (whose polarity is plus), the output of the subtracter 731a becomes minus, and the output of the proportional-integral controller 732a decreases. Thus, also the output of the adder 734 decreases. In an ordinary case where the output of the adder 734 lies between the voltage upper-limit set value VLMTH and the voltage lower-limit set value VLMTL, the voltage limiter 733a1 does not function, and the output of the adder 734 is directly inputted to the subtracter 731b through the switch 735, so that also the output of the subtracter 731b decreases. Thus, the output of the proportional-integral controller 732b decreases, and also the DC-DC converter current command IDD* generated through the current limiter 733b decreases. Owing to such a control operation, the electric power PS which the power storage system emits decreases.

On the other hand, in the powering acceleration mode of the electric car, in a case where the electric power PS emitted by the power storage system is small relative to the basic power command PO*, the output of the subtracter 731a becomes plus, and the output of the proportional-integral controller 732a increases. Thus, also the output of the adder 734 increases. In the ordinary case where the output of the adder 734 lies between the voltage upper-limit set value VLMTH and the voltage lower-limit set value VLMTL, the voltage limiter 733a1 does not function, and the output of the adder 734 is directly inputted to the subtracter 731b through the switch 735, so that also the output of the subtracter 731b increases. Thus, the output of the proportional-integral controller 732b increases, and also the DC-DC converter current command IDD* generated through the current limiter 733b increases. Owing to such a control operation, the electric power PS which the power storage system emits increases.

Owing to the control operations as stated above, the electric power PS emitted by the power storage system 70 is controlled so as to agree with the basic power command PO*, and the output of the proportional-integral controller 732a becomes substantially zero in the steady state. By the way, in a case where the electric car is in the regenerative braking mode, control operations are similar to those described above, except that the polarities of the basic power command PO* and the electric power PS become minus, and hence, description shall be omitted.

(2) Independent Travel Mode (State where the Switch 735 has Been Changed-Over onto the Side of the Second Voltage Command VS2B*)

The second voltage command VS2B* is inputted to the subtracter 731b through the switch 735, and the difference between the command VS2B* and the voltage VS2 of the capacitor 73 is taken by the subtracter 731b.

In the powering acceleration mode or the regenerative braking mode of the electric car, when the voltage VS2 of the capacitor 73 becomes larger than the second voltage command VS2B*, the output of the subtracter 731b becomes minus, and the output of the proportional-integral controller 732b decreases. Thus, also the DC-DC converter current command IDD* outputted through the current limiter 733b decreases, and the electric power PS emitted by the power storage system 70 decreases, so that the voltage VS2 of the capacitor 73 decreases.

Conversely, when the voltage VS2 of the capacitor 73 becomes smaller than the second voltage command VS2B*, the output of the subtracter 731b becomes plus, and the output of the proportional-integral controller 732b increases. Thus, also the DC-DC converter current command IDD* outputted through the current limiter 733b increases, and the electric power PS emitted by the power storage system 70 increases, so that the voltage VS2 of the capacitor 73 increases.

Owing to the control operations as stated above, the voltage VS2 of the capacitor 73 is controlled so as to agree with the second voltage command VS2B*.

FIG. 6 is a diagram showing the configurational example of the voltage sudden decrease detection portion 760. As shown in FIG. 6, the voltage sudden decrease detection portion 760 is such that the voltage VS2 of the capacitor 73 is inputted to a voltage decrement calculation portion 761 through a filter 762a, and that a voltage decrement $\Delta V/\Delta T$ is subsequently calculated by the voltage decrement calculation portion 761. The voltage decrement $\Delta V/\Delta T$ is inputted to a comparator 763 through a filter 762b, and is compared with a voltage decrement set value VDC. In a case where the voltage decrement $\Delta V/\Delta T$ is smaller than the voltage decrement set value VDC (that is, in a case where the voltage VS2 of the capacitor 73 has decreased more suddenly than a decrement set by the voltage decrement set value), the comparator 763 outputs a high level. The output of the comparator 763 is outputted as a voltage sudden decrease detection signal VD.

Incidentally, the filters 762a and 762b eliminate unnecessary high-frequency noise contained in the voltage VS2, and they may be disposed at need. Besides, the voltage sudden decrease detection portion 760 is so configured as to calculate and compare the voltage decrement $\Delta V/\Delta T$, but any other configuration may well be employed as long as the decrease of the voltage can be detected. By way of example, the decrease of the voltage can also be detected by comparing signals which have been obtained by passing the voltage VS2 through a plurality of filters of different time constants.

By the way, in FIG. 6, the configuration is such that the voltage VS2 of the capacitor 73 is inputted to the voltage sudden decrease detection portion 760, but the input voltage VS1, or the voltage VT2 or input voltage VT1 of the capacitor 63 of the drive control device 60 may well be inputted and used instead.

FIG. 7 is a diagram showing the configurational example of the low voltage detection portion 770.

As shown in FIG. 7, the low voltage detection portion 770 is such that the voltage VS2 of the capacitor 73 is inputted through a filter 771, and that the output of the filter 771 is inputted to comparators 772a and 772b so as to be compared with a first low voltage set value LVC1 and a second low voltage set value LVC2, respectively.

The comparator 772a outputs a high level in a case where its input has become lower than the first low voltage set value LVC1, and the comparator 772b outputs a high level in a case where its input has become lower than the second low voltage set value LVC2.

The output of the comparator 772b is inputted to a delay circuit 773, and the output of the delay circuit 773 becomes a high level in a case where the output of the comparator 772b continues to be the high level for a fixed time period ($\Delta$tsa).

Lastly, a logical sum circuit 774 takes the logical sum between the outputs of the comparator 772a and the delay circuit 773, and it outputs a low voltage detection signal LV. By the way, in FIG. 7, the configuration is such that the voltage VS2 of the capacitor 73 is inputted to the low voltage detection portion 770, but the input voltage VS1, or the voltage VT2 or input voltage VT1 of the capacitor 63 of the drive control device 60 may well be inputted and used instead.

FIG. 8 is a diagram showing the configurational example of the overvoltage detection portion 780.

As shown in FIG. 8, the overvoltage detection portion 780 is such that the voltage VS2 of the capacitor 73 is inputted through a filter 781, and that the output of the filter 781 is inputted to comparators 782a and 782b so as to be compared with a first overvoltage set value OVC1 and a second overvoltage set value OVC2, respectively.

The comparator 782a outputs a high level in a case where its input has exceeded the first overvoltage set value OVC1, and the comparator 782b outputs a high level in a case where its input has exceeded the second overvoltage set value OVC2.

The output of the comparator 782b is inputted to a delay circuit 783, and the output of the delay circuit 783 becomes a high level in a case where the output of the comparator 782b continues to be the high level for a fixed time period ($\Delta$tsb).

Lastly, a logical sum circuit 784 takes the logical sum between the outputs of the comparator 782a and the delay circuit 783, and it outputs an overvoltage detection signal OV. By the way, in FIG. 8, the configuration is such that the voltage VS2 of the capacitor 73 is inputted to the overvoltage detection portion 780, but the input voltage VS1, or the voltage VT2 or input voltage VT1 of the capacitor 63 of the drive control device 60 may well be inputted and used instead.

FIG. 9 is a diagram for explaining the relationship in Embodiment 1 of the invention, among the first and second overvoltage set values OVC1 and OVC2, the first and second low voltage set values LVC1 and LVC2, the voltage upper-limit set value VLMTH, the voltage lower-limit set value VLMTL, an overvoltage stop level at which the drive control device 60 is stopped by sensing the overvoltage, and a low voltage stop level at which the drive control device 60 is stopped by sensing the low voltage.

As shown in FIG. 9, the set voltages become higher in the order of the overvoltage stop level of the drive control device 60, the first overvoltage set value OVC1, the voltage upper-limit set value VLMTH, the second overvoltage set value OVC2, the second low voltage set value LVC2, the voltage lower-limit set value VLMTL, the first low voltage set value LVC1, and the low voltage stop level of the drive control device 60. Incidentally, the second overvoltage set value OVC2 is set at a value which is slightly lower than the voltage upper-limit set value VLMTH, and the second low voltage set value LVC2 is set at a value which is slightly higher than the voltage lower-limit set value VLMTL.

Next, there will be described control operations on the occasion of the overhead-line service interruption and on the occasion of the overhead-line grounding, in the configuration of the control apparatus for the electric car as shown in the foregoing embodiment 1.

FIG. 10 is a diagram for explaining the operation on the occasion of the overhead-line service interruption in Embodiment 1 of the invention. By the way, in the ensuing description, there will be supposed a case where, during the travel of the electric car in the current-collection travel mode, the overhead line 3 has shifted from a normal state into a service interruption state, and the operation will be in the state where the switch 735 in the DC-DC converter current command generation portion 730 has been changed-over onto the side of the first voltage command VS2A*.

FIG. 10(*a*) and FIG. 10(*b*) show typical operations in the powering acceleration mode and in the regenerative braking mode, respectively. In each of the figures, the uppermost stage is a diagram showing the temporal changes of the electric powers PP, PL and PS, a middle stage is a diagram showing the temporal change of the voltage VS2 of the capacitor 73, and the lowermost stage is a diagram showing the operations of the switches 61 and 71.

(Case where the Overhead-Line Service Interruption has Occurred in the Powering Acceleration Mode)

The operation in the powering acceleration mode will be described in conjunction with FIG. 10(*a*).

A time t0*a*-a time t1*a* is a period during which the overhead line does not undergo the service interruption. As already described, the power storage system 70 has the DC-DC converter 74 controlled by the DC-DC converter power command generation portion 730(1) and the DC-DC converter control portion 740 on the basis of the basic power command PO* which is set at the value smaller than the magnitude of the electric power PL by the absorption/emission command generation portion 720 shown in FIG. 4, so that the magnitude of the electric power PS emitted by the power storage system 70 is controlled into a state where it is smaller than the magnitude of the electric power PL. Therefore, the deficient electric power PP (=PL−PS) is fed from the substation 1 to the electric car through the current collector 20. Since the sum between the electric power PS emitted by the power storage system 70 and the electric power PP fed from the substation 1 is equal to the electric power PL in a balanced state, the voltage VS2 of the capacitor 73 is maintained substantially by the voltage of the overhead line 3, and it lies between the voltage upper-limit set value VLMTH and the voltage lower-limit set value VLMTL.

It is assumed that, at the time point of the time t1a, the service interruption of the overhead line 3 occurred for such a reason that the switch 2 of the substation 1 was opened or that the disconnected place 10 appeared in the overhead line 3. Thus, the power feed from the substation 1 is cut off, and the electric power PP which is fed from the substation 1 to the electric car through the current collector 20 becomes zero.

The auxiliary power source device 51 and the drive control inverter 64 are usually subjected to constant-power controls so as to continue the feeds of fixed electric powers to the load 52 and the driving motor 65, respectively, so that the electric powers PA and PT do not change even after the service interruption of the overhead line 3, and also the electric power PL being the sum of the electric powers PA and PT becomes constant without changing.

As already described, the magnitude of the electric power PS of the power storage system 70 remains controlled to the value smaller than the magnitude of the electric power PL.

In this state, the magnitude of the electric power PS emitted by the power storage system 70 is deficient relative to the magnitude of the dissipated electric power PL, and moreover, the power feed from the substation 1 is nonexistent. Therefore, the deficient electric power is supplied in such a manner that electric powers stored in the capacitor 63 within the drive control device 60 and the capacitor 73 within the power storage system 70 are dissipated. In consequence, the voltage VS2 of the capacitor 73 begins to lower from the time t1a on.

Subsequently, when the voltage VS2 of the capacitor 73 becomes, at most, the voltage lower-limit set value VLMTL at the time point of a time t2a, the input of the voltage limiter 733a1 of the DC-DC converter current command generation portion 730(1) (FIG. 5) becomes lower than the voltage lower-limit set value VLMTL, and the first voltage command VS2A* being the output of the voltage limiter 733a1 is limited to the value VLMTL. Therefore, the output of the subtracter 731b with the voltage VS2 subtracted from the value VLMTL begins to increase in the plus direction, and it is amplified by the proportional-integral controller 732b, so that the DC-DC converter current command IDD* increases in the plus direction. Therefore, the DC-DC converter 74 is controlled so that its current may increase in the plus direction, and the electric power PS which the power storage system 70 emits increases.

When the electric power PS emitted by the power storage system 70 increases, the deficiency of the electric power PS emitted by the power storage system 70, relative to the dissipated electric power PL is improved, and the lowering of the voltage VS2 of the capacitor 73 is suppressed. The output of the proportional-integral controller 732b continues to increase in the plus direction until the voltage VS2 of the capacitor 73 agrees with the voltage lower-limit set value VLMTL, so that the input of the proportional-integral controller 732b becomes zero. Eventually, therefore, the electric power PS emitted by the power storage system 70 is stabilized at the point of time when it has been balanced with the dissipated electric power PL, and this state is maintained.

In this manner, the magnitude of the basic power command PO* being the output of the absorption/emission command generation portion 720 remains set at the value smaller than the magnitude of the electric power PL, but the electric power PS emitted by the power storage system 70 increases until the voltage VS2 of the capacitor 73 agrees with the voltage lower-limit set value VLMTL, and this electric power PS is controlled into the state where it is balanced with the electric power PL. Therefore, the dissipation of the electric powers from the capacitors 63 and 73 is stopped, and the voltage VS2 of the capacitor 73 is maintained at the value VLMTL.

In the period of the time t2a-a time t3a, the electric power PS is controlled into the state where it is balanced with the electric power PL, as stated above, and the voltage VS2 of the capacitor 73 is in the state where it is maintained at the value VLMTL. In this state, in the low voltage detection portion 770, the voltage VS2 of the capacitor 73 becomes, at most, the second low voltage detection level LVC2, so that the comparator 772b outputs the high level, and the delay circuit 733 starts a time period measurement.

Subsequently, at the time point of the time t3a, the set time period Δtsa of the delay circuit 773 lapses, the low voltage detection signal LV is outputted through the logical sum circuit 774, the DC-DC converter stop command COF and a stop command SOF for the switches 61 and 71 are outputted through the logical sum circuit 790 (FIG. 2), the DC-DC converter 74 is stopped, and the switches 71 and 61 are opened. Incidentally, the general switch 40 may well be opened by a stop command SOF1.

By the way, in a case where the electric power PS cannot be controlled into the state where it is balanced with the electric power PL, for the time period of the time t2a-the time t3a, on account of the fault of the DC-DC converter control portion 740, or the like, and where the voltage VS2 of the capacitor 73 cannot be maintained at the value VLMTL, the voltage VS2 of the capacitor 73 becomes, at most, the first low voltage detection level LVC1. Therefore, the comparator 772a (FIG. 7) outputs the high level, the low voltage detection signal LV is outputted through the logical sum circuit 774, the DC-DC converter stop command COF and the stop command SOF for the switches 61 and 71 are outputted through the logical sum circuit 790, the DC-DC converter 74 is stopped, and the switches 71 and 61 are opened. Incidentally, the general switch 40 (FIG. 1) may well be opened by the stop command SOF1.

(Case where the Overhead-Line Service Interruption has Occurred in the Regenerative Braking Mode)

The operation in the regenerative braking mode will be described in conjunction with FIG. 10(b).

By the way, in the regenerative braking mode, electric power generated by the driving motor 65 is regenerated through the drive control inverter 64, so that the electric power PT becomes electric power whose sense is a regeneration direction opposite to the direction in the powering acceleration mode. The electric power PA which the auxiliary power source device 51 dissipates does not differ that in the powering acceleration mode, but the magnitude of the generated electric power PT is much larger as compared with the magnitude of the dissipated electric power PA, and hence, the electric power PL being the sum of these electric powers PT and PA becomes the electric power in the regeneration direction.

A time t0b-a time t1b is a period during which the overhead line does not undergo the service interruption. As already described, the power storage system 70 has the DC-DC converter 74 controlled by the DC-DC converter current command generation portion 730(1) and the DC-DC converter control portion 740 on the basis of the basic power command PO* which is set at the value smaller than the magnitude of the electric power PL by the absorption/emission command generation portion 720 shown in FIG. 4, so that the magnitude of the electric power PS absorbed by the power storage system 70 is controlled into a state where it is smaller than the magnitude of the generated electric power PL. Therefore, the excessive electric power PP (=PL−PS) is emitted to the substation 1 through the current collector 20. The sum between the electric power PS absorbed by the power storage system 70 and the electric power PP emitted to the substation 1 is in a state where it is equal to the generated electric power PL in a balanced state, so that the voltage VS2 of the capacitor 73 is maintained substantially by the voltage of the overhead line 3, and it lies between the voltage upper-limit set value VLMTH and the voltage lower-limit set value VLMTL.

The service interruption of the overhead line 3 is assumed to have occurred at the time point of the time t1$b$, for such a reason that the switch 2 of the substation 1 was opened or that the disconnected place 10 appeared in the overhead line 3. Thus, a power emission path to the substation 1 is cut off, and the electric power PP which is emitted to the substation 1 through the current collector 20 becomes zero.

The auxiliary power source device 51 and the drive control inverter 64 are usually subjected to the constant-power controls so as to continue the feed of the fixed electric power to the load 52 and to continue the generation of the fixed power by the driving motor 65, respectively, so that the electric powers PA and PT do not change even after the service interruption of the overhead line 3, and also the electric power PL being the sum of the electric powers PA and PT becomes constant without changing.

On the other hand, the magnitude of the electric power PS absorbed by the power storage system 70 remains controlled to the value smaller than the magnitude of the electric power PL, as already described.

In this state, the generated electric power PL is excessive relative to the electric power PS absorbed by the power storage system 70, and moreover, the power emission path to the substation 1 is in the cut-off state, so that the excessive electric power is stored in the capacitor 63 within the drive control device 60 and the capacitor 73 within the power storage system 70. Therefore, the voltage VS2 of the capacitor 73 begins to increase from the time t1$b$ on.

Subsequently, when the voltage VS2 of the capacitor 73 becomes, at least, the voltage upper-limit set value VLMTH at the time point of a time t2$b$, the input of the voltage limiter 733$a$1 of the DC-DC converter current command generation portion 730(1) (FIG. 5) becomes higher than the voltage higher-limit set value VLMTH, and the first voltage command VS2A* being the output of the voltage limiter 733$a$1 is limited to the value VLMTH. Therefore, the output of the subtracter 731$b$ with the voltage VS2 subtracted from the value VLMTH begins to increase in the minus direction, and it is amplified by the proportional-integral controller 732$b$, so that the DC-DC converter current command IDD* increases in the minus direction. Therefore, the DC-DC converter 74 is controlled so that the magnitude of its current may increase in the minus direction, and the electric power PS which the power storage system 70 absorbs increases.

When the electric power PS absorbed by the power storage system 70 increases, the state where the generated electric power PL is excessive relative to the electric power PS absorbed by the power storage system 70 is improved, and the rise of the voltage VS2 of the capacitor 73 is suppressed. The output of the proportional-integral controller 732$b$ continues to increase in the minus direction until the voltage VS2 of the capacitor 73 agrees with the voltage upper-limit set value VLMTH, so that the input of the proportional-integral controller 732$b$ becomes zero. Eventually, therefore, the electric power PS absorbed by the power storage system 70 is stabilized at the point of time when it has been balanced with the electric power PL being the regenerative electric power, and this state is maintained.

In this manner, the magnitude of the basic power command PO* being the output of the absorption/emission command generation portion 720 remains set at the value smaller than the magnitude of the generated electric power PL, but the magnitude of the electric power PS absorbed by the power storage system 70 increases until the voltage VS2 of the capacitor 73 agrees with the voltage higher-limit set value VLMTH, and the electric power PS is controlled into the state where it is balanced with the electric power PL. Therefore, the storage of the electric powers in the capacitors 63 and 73 is stopped, and the voltage VS2 of the capacitor 73 is maintained at the value VLMTH.

In the period of the time t2$b$-a time t3$b$, the electric power PS is controlled into the state where it is balanced with the electric power PL, as stated above, and the voltage VS2 of the capacitor 73 is in the state where it is maintained at the value VLMTH.

In this state, in the overvoltage detection portion 780 (FIG. 8), the voltage VS2 of the capacitor 73 becomes, at least, the second overvoltage detection level OVC2, so that the comparator 782$b$ outputs the high level, and the delay circuit 783 starts a time period measurement.

Subsequently, at the time point of the time t3$b$, the set time period Δtsb of the delay circuit 783 lapses, the overvoltage detection signal OV is outputted through the logical sum circuit 784, the DC-DC converter stop command COF and the stop command SOF for the switches 61 and 71 are outputted through the logical sum circuit 790, the DC-DC converter 74 is stopped, and the switches 71 and 61 are opened. Incidentally, the general switch 40 may well be opened by the stop command SOF1.

By the way, in a case where the electric power PS cannot be controlled into the state where it is balanced with the electric power PL, for the time period of the time t2$b$-the time t3$b$, on account of the fault of the DC-DC converter control portion 740, or the like, and where the voltage VS2 of the capacitor 73 cannot be maintained at the value VLMTH, the voltage VS2 of the capacitor 73 becomes, at least, the first overvoltage detection level OVC1. Therefore, the comparator 782$a$ outputs the high level, the overvoltage detection signal OV is outputted through the logical sum circuit 784, the DC-DC converter stop command COF and the stop command SOF for the switches 61 and 71 are outputted through the logical sum circuit 790, the DC-DC converter 74 is stopped, and the switches 71 and 61 are opened. Incidentally, the general switch 40 may well be opened by the stop command SOF1.

By the way, in an electric railway, a phenomenon called the "contact loss", in which the contact between the current collector 20 and the overhead line 3 comes off temporarily on account of the rocking of the overhead line 3 or the vehicle, or the like, and in which the exchange of electric power is cut off, occurs frequently in an ordinary travel. When viewed from the side of the control apparatus for the electric car, the contact loss is the same event as the overhead-line service interruption. However, the time period of the contact loss is usually a time period on the order of several ms—several hundred ms, and it is within several seconds though it becomes longer than the above time period in a case where the electric car passes through an insulation section (not shown) disposed in the overhead line 3.

It is, of course, possible to stop the DC-DC converter 74 and to open the switches 71 and 61, upon judging the overhead-line service interruption at the time point of the time t2$a$ or t2$b$ in FIG. 10($a$) or FIG. 10($b$). However, the drive control device 60 and the power storage system 70 are often stopped on the occasions of the contact loss and the passage through the section as stated above, and this is unfavorable because the stable travel of the electric car is hindered. Therefore, the control apparatus is so configured that, as described above, the control in which the voltage VS2 of the capacitor 73 is maintained at the voltage upper-limit set value VLMTH or the voltage lower-limit set value VLMTL is performed at the time of the service interruption of the overhead line, thereby to permit the operations of the drive control device 60 and the power storage system 70 for a while, whereupon the operations of the drive control device 60 and the power storage system 70 are stopped upon judging the overhead-line service interruption after the time period Δtsa or Δtsb set by the delay circuit 773 or 783.

Of course, the advantages based on the configuration of the invention can be obtained in such a way that the time periods Δtsa and Δtsb which are set by the respective delay circuits 773 and 783 are set to be longer than the contact-loss time period and the section-passage time period. Besides, it is needless to say that the time periods Δtsa and Δtsb should preferably be as short as possible, from the viewpoint of the prevention of the reverse application of the voltage to the overhead line 3 at the time of the overhead-line service interruption as is the original object, and it is suitable to set the time periods at several seconds or so.

FIG. 11 is a diagram for explaining the operation on the occasion of the overhead-line grounding in Embodiment 1 of the invention. By the way, in the ensuing description, there will be supposed a case where, during the travel of the electric car in the current-collection travel mode, the overhead line 3 has shifted from the normal state into a grounded state. In FIG. 11, the uppermost stage is a diagram showing the state of the overhead line 3, a middle stage is a diagram showing the temporal change of the voltage VS2 of the capacitor 73, and the lowermost stage is a diagram showing the operations of the switches 61 and 71.

A time t0c-a time t1c is a period during which the overhead line is not grounded, but it is normal, and the operation of the power storage system 70 is similar to the operation shown at t0a-t1a or t0b-t1b in FIG. 10.

The voltage VS2 of the capacitor 73 is maintained substantially by the voltage of the overhead line 3, and it lies between the voltage upper-limit set value VLMTH and the voltage lower-limit set value VLMTL.

Now, it is assumed that the overhead line 3 was grounded by the grounding path 11 at the time point of the time tlc. In general, the impedance of a grounded place is very slight, so that a large grounding current IG flows, and electric powers stored in the capacitor 63 within the drive control device 61 and the capacitor 73 within the power storage system 70 are suddenly emitted toward the grounded place. Therefore, the voltage VS2 of the capacitor 73 begins to suddenly lower from the time t1c on.

When the voltage decrement ΔV/ΔT calculated by the voltage decrement calculation portion 761 of the voltage sudden decrease detection portion 760 becomes smaller than the voltage decrement set value VDC on account of the sudden lowering of the voltage VS2, the comparator 763 makes the voltage sudden decrease detection signal VD the high level and inputs this high level to the logical sum circuit 790, the DC-DC converter stop command COF and the stop command SOF for the switches 61 and 71 are outputted from the logical sum circuit 790, the DC-DC converter 74 is stopped, and the switches 71 and 61 are opened.

Besides, on the occasion of the overhead-line grounding, the large grounding current IG flows to the grounded place, so that power feed to the grounded place needs to be quickly stopped for the purpose of avoiding the expansion of a damage. Therefore, the control apparatus is so configured that, when the sudden lowering of the voltage VS2 of the capacitor 73 has been detected, it is quickly performed to stop the DC-DC converter 74 and to open the switches 71 and 61.

By the way, in a case where, in order to avoid the standstill of the electric car after the occurrence of the overhead-line service interruption or the overhead-line grounding as stated above, the electric car is moved to the nearest station, or where the vehicle is caused to travel in a section in which the overhead line 3 is nonexistent, the control mode command CMC is changed-over to the independent travel mode by setting from the motorman, the central command center (not shown) or the like, and the switch 735 in the DC-DC converter current command generation portion 730 is changed-over onto the side of the second voltage command VS2B*. The second voltage command VS2B* may be set at a voltage with which the auxiliary power source device 51 and the drive control device 60 operate most efficiently. In general, the second voltage command VS2B* should preferably be equalized to a nominal overhead-line voltage, but it can also be changed in some cases.

Thus, the DC-DC converter 74 is controlled so that the voltage VS2 of the capacitor 73 may agree with the second voltage command VS2B*. Therefore, the auxiliary power source device 51 and the drive control device 60 can be stably operated, and the vehicle can be moved to the nearest station or can be caused to travel in the section in which the overhead line 3 is nonexistent, during the overhead-line service interruption or the overhead-line grounding. Of course, in this case, in order to prevent the reverse application of the voltage to the overhead line 3, the current collector 20 is folded up, or the general switch 40 is turned OFF. The switch 61 of the drive control device 60 may well be turned OFF.

In this manner, according to the configuration of Embodiment 1 of the invention, on the occasion of the overhead-line service interruption or the overhead-line grounding in the current-collection travel mode in which the exchange of the electric power with the substation 1 is performed, the service interruption or the grounding can be quickly detected to stop the DC-DC converter 74 and to open the switches 71 and 61 and the general switch 40.

Thus, it is permitted to obtain the control apparatus for the electric car, which can eliminate the problem that the side of the power storage system 70 reversely applies the voltage to the overhead line 3 on the occasion of the overhead-line service interruption in the case where the overhead line 3 is to be intentionally brought to the service interruption, in the case where the disconnected place has appeared in the overhead line, or in the like case.

Besides, it is permitted to obtain the control apparatus for the electric car, in which the power storage system 70 can be quickly stopped on the occasion of the overhead-line grounding so as to prevent this system from continuing to feed the electric power to the grounded place and thereby expanding the damage of the grounded place.

Incidentally, it is permitted to obtain the control apparatus for the electric car, in which in the independent travel mode where the electric power is not exchanged with the substation 1, the auxiliary power source device 51 and the drive control device 60 can be stably operated, and the vehicle can be caused to travel, without reversely applying the voltage to the overhead line 3.

Embodiment 2

A configurational example of a control apparatus for an electric car in Embodiment 2 of the invention will be described below.

Incidentally, as compared with Embodiment 1, Embodiment 2 differs only in the configuration of the DC-DC converter current command generation portion 730(2) as stated below, and hence, only this portion will be described.

FIG. 12 is a diagram showing a configurational example of the DC-DC converter current command generation portion 730(2) in Embodiment 2 of the invention. As shown in FIG. 12, the DC-DC converter current command generation portion 730(2) is so configured that the switch 735 is omitted from the DC-DC converter current command generation portion 730(1), that the voltage limiter 733a1 is replaced with a new voltage limiter 733a2, and that the output of the voltage limiter 733a2 is inputted to the subtracter 731b.

The second voltage command VS2B* and the control mode command CMC are inputted to the voltage limiter 733a2. The voltage limiter 733a2 is so configured that, in a case where the control mode command CMC instructs the current-collection travel mode, the voltage upper-limit set value VLMTH and the voltage lower-limit set value VLMTL are set just as in Embodiment 1, while in a case where the control mode command CMC instructs the independent travel mode, both the voltage upper-limit set value VLMTH and the voltage lower-limit set value VLMTL are set at the same value as the value of the second voltage command VS2B*.

Owing to such a configuration, the same advantages as those of the change-over of the voltage command by the switch as shown in Embodiment 1 can be obtained only by altering the set values of the voltage limiter 733a2 at the change of the control mode command CMC, and the DC-DC converter current command generation portion can be configured of a single control system. It is therefore permitted to obtain the control apparatus for the electric car, in which the configuration of H/W or S/W is simplified.

Embodiment 3

FIG. 13 is a diagram showing a configurational example of a control apparatus for an electric car in Embodiment 3 of the invention.

Incidentally, since Embodiment 3 is based on the configuration of Embodiment 1, portions described in Embodiment 1 shall be omitted from description, and only portions which differ in contents from Embodiment 1 will be described.

When compared with FIG. 1 of Embodiment 1, FIG. 13 is such that a signal generation portion 100 is connected in parallel with the voltage source 1a in the substation 1, and that a signal detection portion 110 is connected between the current collector 20 and the wheel 22.

The signal generation portion 100 generates a signal which contains a frequency of, for example, several kHz-several GHz, and the signal detection portion 110 is so configured as to detect the signal of the frequency generated by the signal generation portion 100, to decide the existence or nonexistence of the signal, and to output an opening signal SOF2 for the general switch 40 and a decision result signal HDD.

Incidentally, the signal which is generated by the signal generation portion 100 may have a single frequency, but it may well be a signal subjected to modulation.

FIG. 14 is a diagram for explaining a configurational example and the operation of Embodiment 3 of the invention.

The signal is generated from a signal source 101a within the signal generation portion 100, and it is inputted to the signal detection portion 110 via the current collector 20 and the wheel 22 through the overhead line 3 and the rail 21. The signal detection portion 110 is so configured that, inside this portion, the component of the signal generated by the signal source 101a is extracted by an extraction portion 110a, so as to decide the existence or nonexistence of the signal component by a decision circuit 110b, and that the result of the decision is outputted as the opening signal SOF2 for the general switch 40 and the decision result signal HDD.

In the normal state where the overhead line 3 has neither the disconnected place 10 nor the grounding path 11, the signal generated from the signal source 101a is inputted to the signal detection portion 110 via the current collector 20 and the wheel 22 through the overhead line 3 and the rail 21, and the component of the signal is extracted by the extraction portion 110a. Thereafter, the existence of the signal is judged by the decision circuit 110b, and neither the opening signal SOF2 for the general switch 40, nor the decision result signal HDD is outputted. In the state where the overhead line 3 has the disconnected place 10 or the grounding path 11, the signal generated from the signal source 101a is not inputted to the signal detection portion 110 via the current collector 20 and the wheel 22 through the overhead line 3 and the rail 21. Therefore, the frequency component of the signal is not extracted by the extraction portion 110a, the nonexistence of the signal is judged by the decision circuit 110b, and the opening signal SOF2 for the general switch 40 and the decision result signal HDD are outputted.

As a result, the general switch 40 is opened, and the switches 61 and 71 are respectively opened by the drive control portion 600 and the power storage system control portion 700 which have received the signal HDD.

Incidentally, it is also allowed to employ a configuration in which the switches 61 and 71 are directly opened by the decision result signal HDD.

Besides, in a case where the overhead line 3 has been intentionally brought to a service interruption, the signal source 101a of the signal generation portion 100 is stopped. Since the signal is not inputted to the signal detection portion 110 in this way, the frequency component of the signal is not extracted by the extraction portion 110a, the nonexistence of the signal is judged by the decision circuit 110b, and the opening signal SOF2 for the general switch 40 and the decision result signal HDD are outputted. As a result, the general switch 40 is opened, and the switches 61 and 71 are respectively opened by the drive control portion 600 and the power storage system control portion 700 which have received the signal HDD. Incidentally, it is also allowed to employ a configuration in which the switches 61 and 71 are directly opened by the decision result signal HDD.

In this manner, owing to the configuration in which the signal is caused to flow between the substation and the vehicle through the overhead line and the rail, and in which the existence or nonexistence of the signal is discriminated on the side of the vehicle, it is permitted to detect the states of the overhead-line service interruption and the overhead-line grounding, and it is permitted to obtain the control apparatus for the electric car, which can stop the power storage system in the case where the disconnected place 10 or the grounding path 11 has appeared in the overhead line 3 or in the case where the overhead line is to be intentionally brought to the service interruption.

Besides, the configurations shown in the foregoing embodiments 1-3 are mere examples of the contents of the invention, and it is needless to say that the individual embodiments can also be configured in combination, that they can also be combined with other known techniques, and that they can also be configured by making alterations such as the omissions of parts, within a scope not departing from the purport of the invention. Although no illustration is made, the invention may well be applied to an AC feeding system in which the substation 1 feeds AC electric power.

INDUSTRIAL APPLICABILITY

Although, in this specification, the description of the contents of the invention has been made by considering the application of a power storage system to an electric railway, the field of application is not limited thereto, but applications to various relevant fields, such as an automobile, an elevator and an electric power system, are possible.

DESCRIPTION OF REFERENCE NUMERALS AND SIGNS

Figure 1:
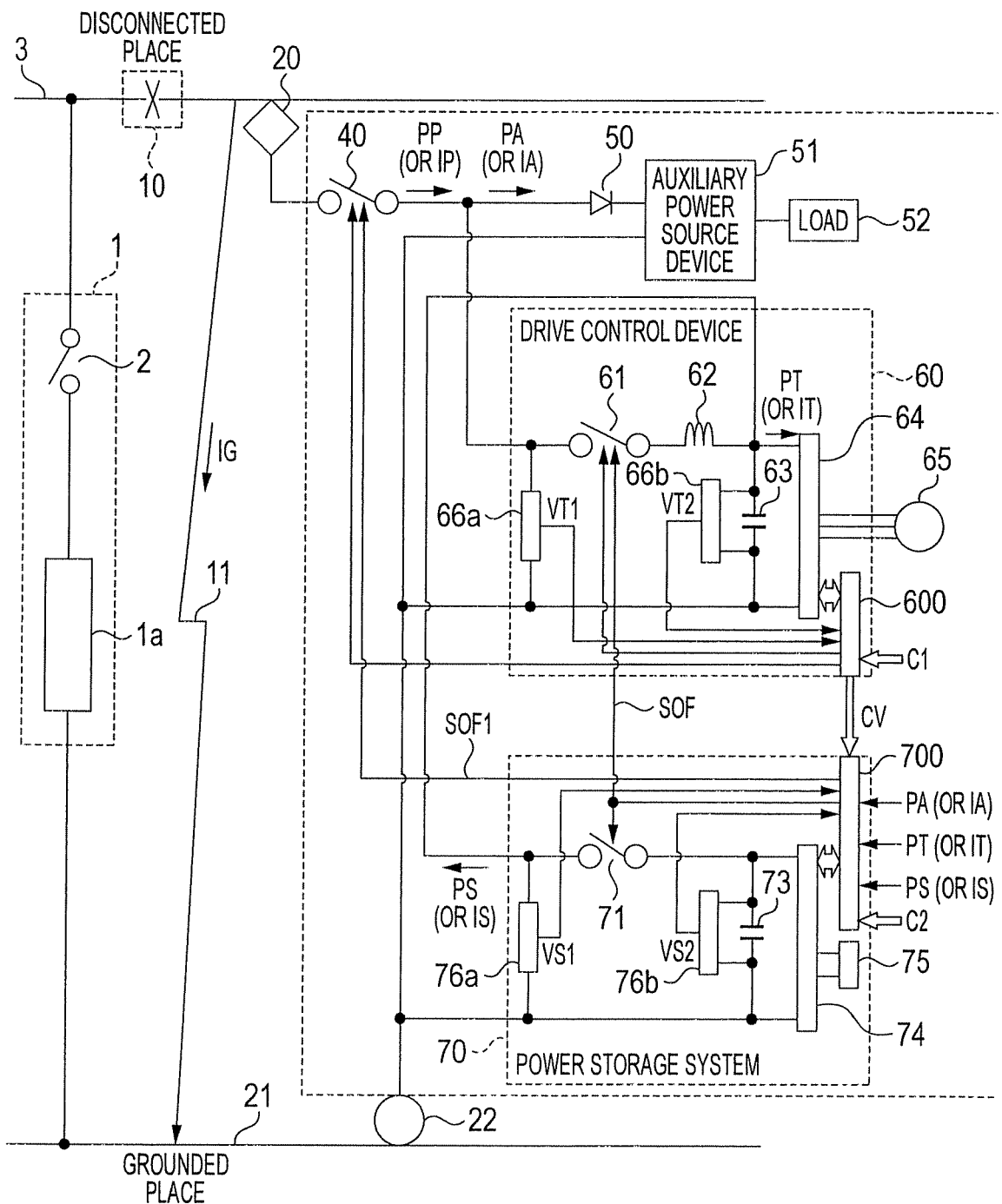
[FIG. 1] It is a diagram showing a configurational example of a control apparatus for an electric car in Embodiment 1 of the present invention.
Figure 2:
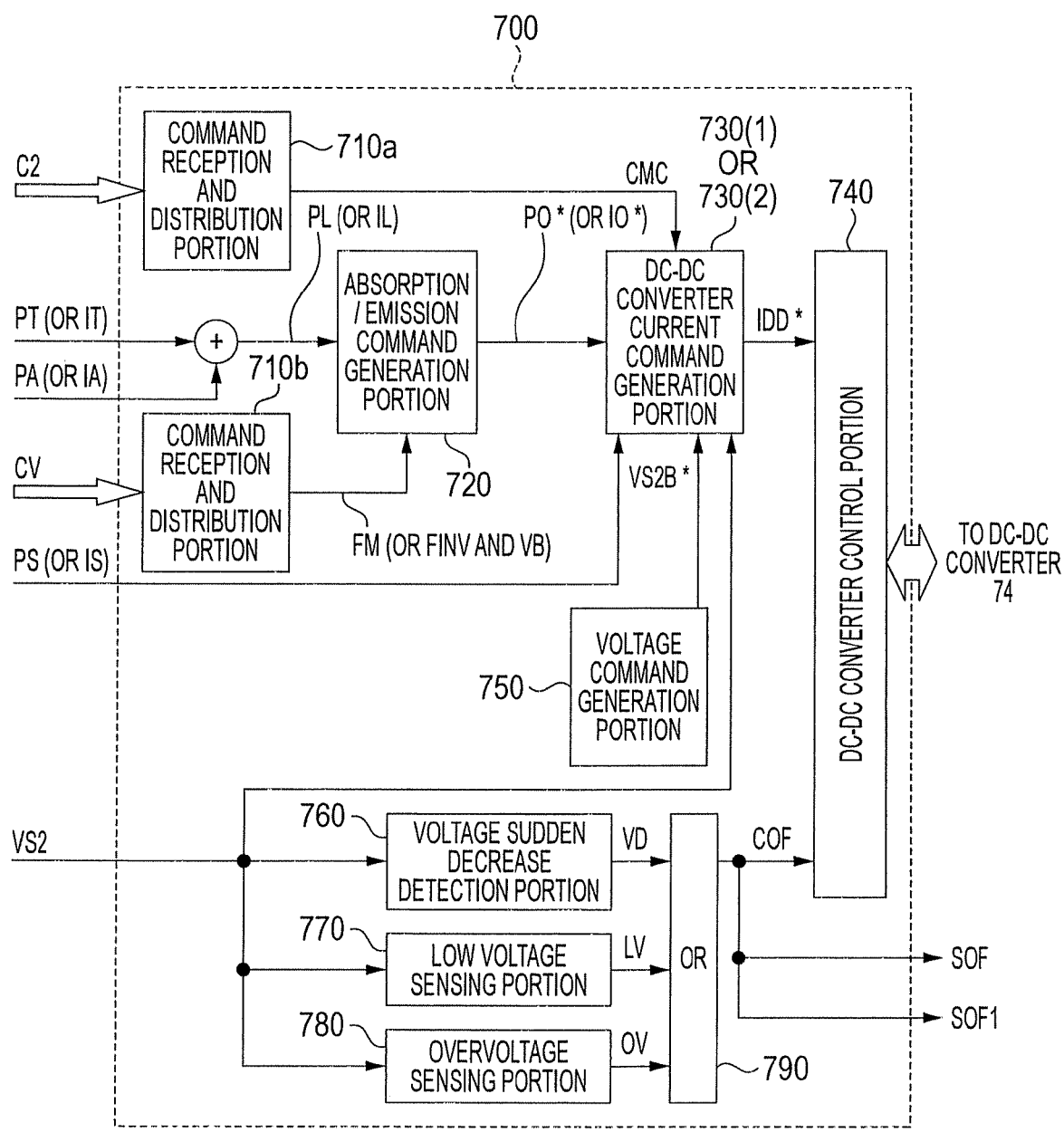
[FIG. 2] It is a diagram showing a configurational example of a power-storage-system control portion in Embodiment 1 of the invention.
Figure 3A:
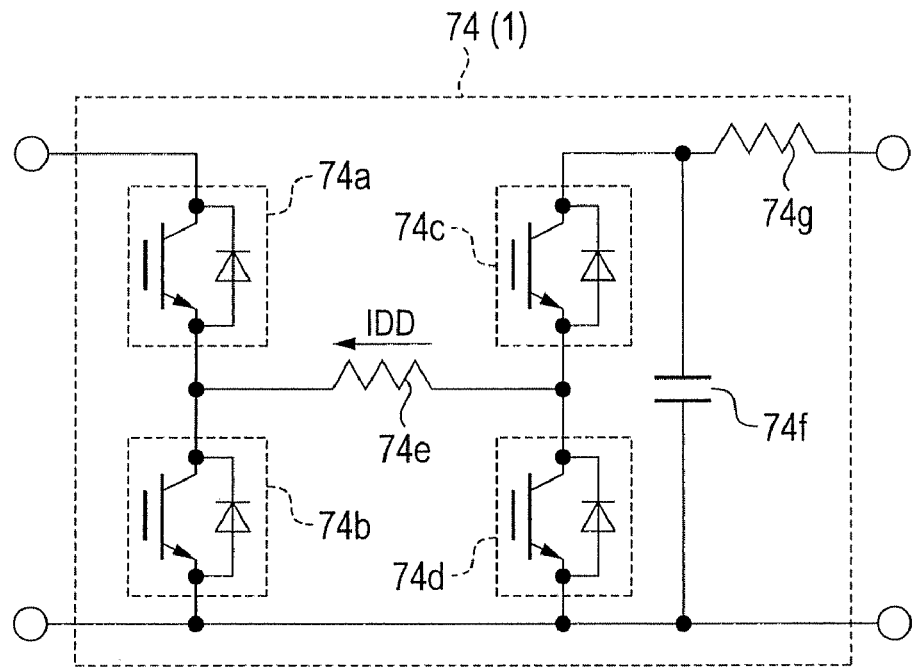
[FIG. 3] It is a diagram showing configurational examples of a DC-DC converter in Embodiment 1 of the invention.
Figure 3B:
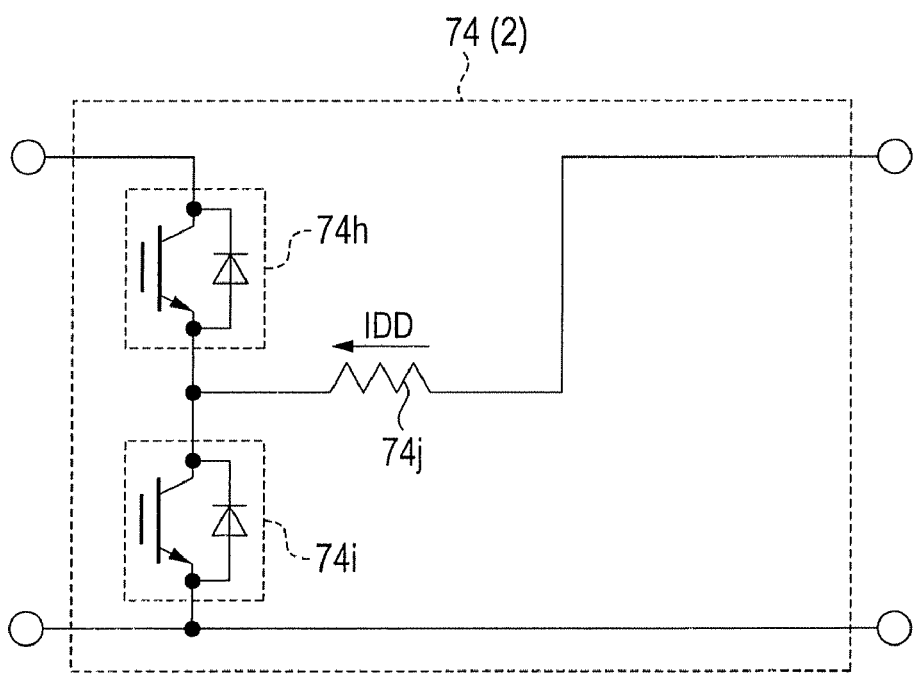
Figure 4:
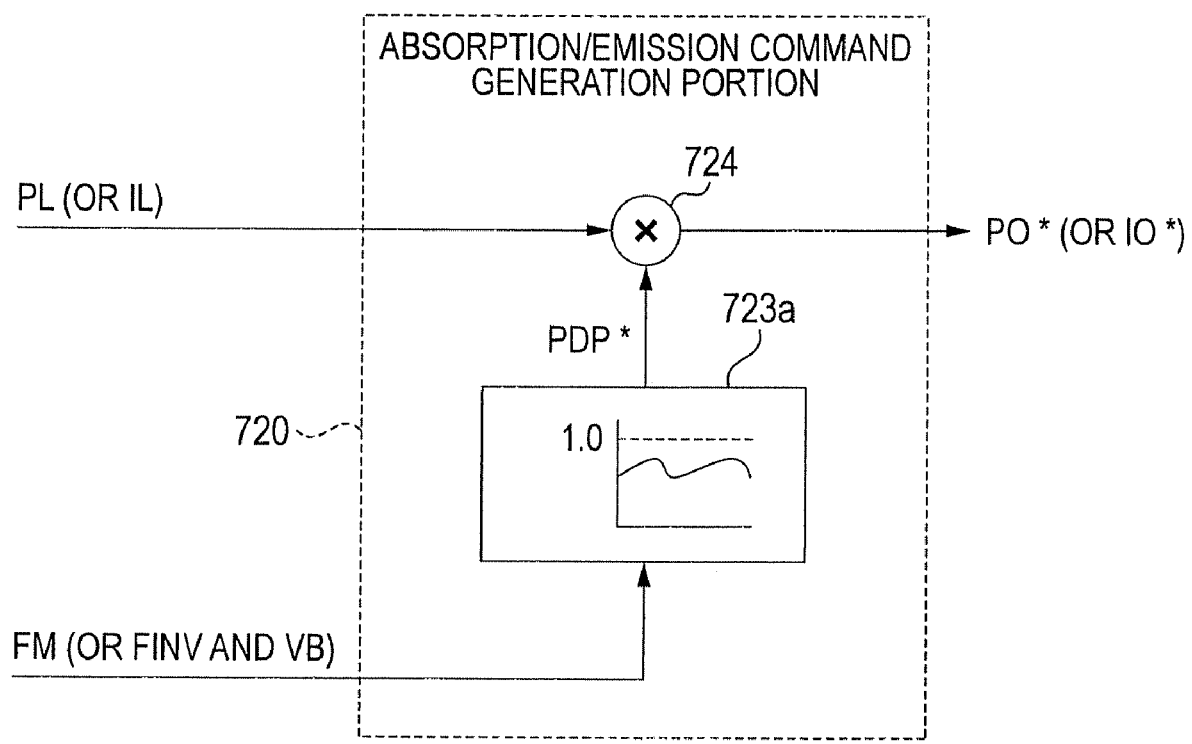
[FIG. 4] It is a diagram showing a configurational example of an absorption/emission command generation portion 720 in Embodiment 1 of the invention.
Figure 5:
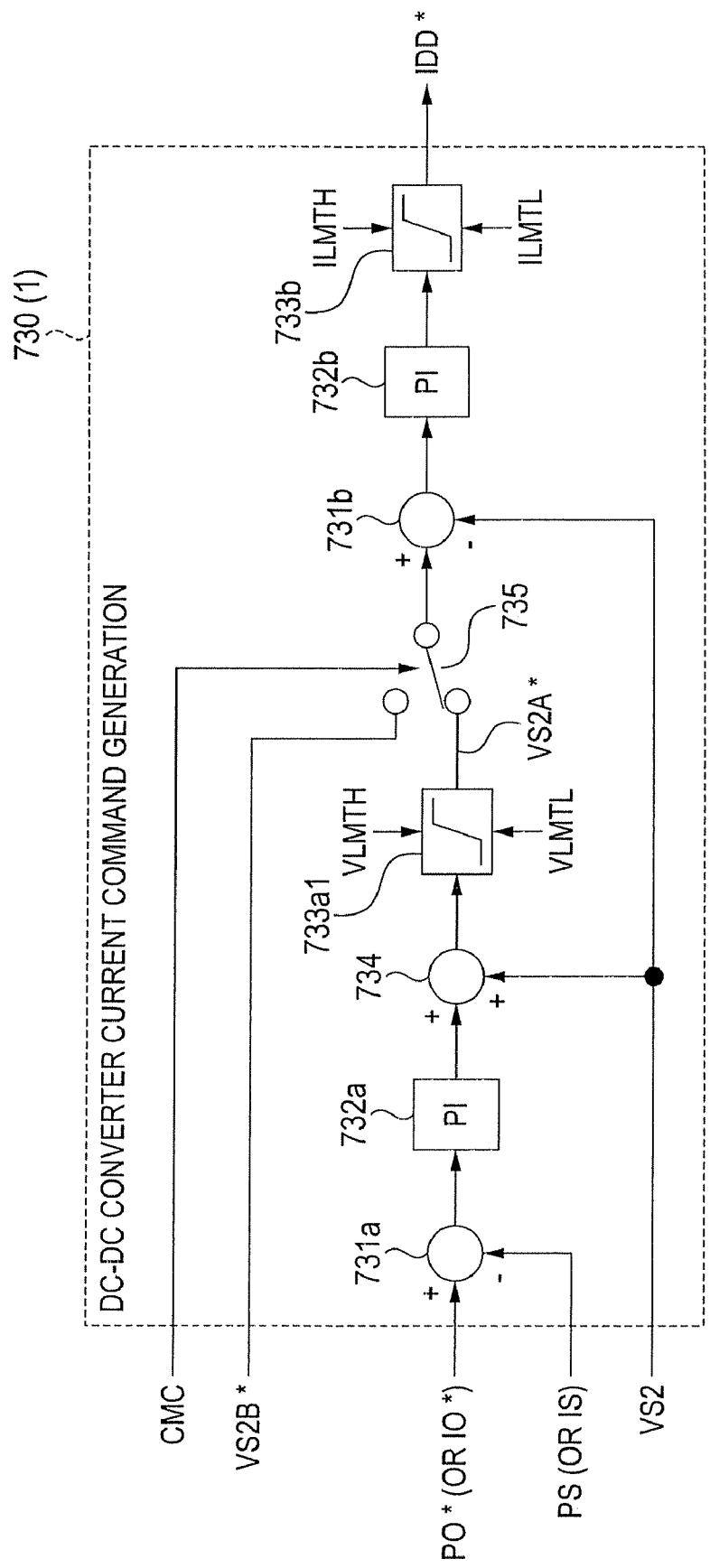
[FIG. 5] It is a diagram showing a configurational example of a DC-DC converter current command generation portion 730(1) in Embodiment 1 of the invention.
Figure 6:
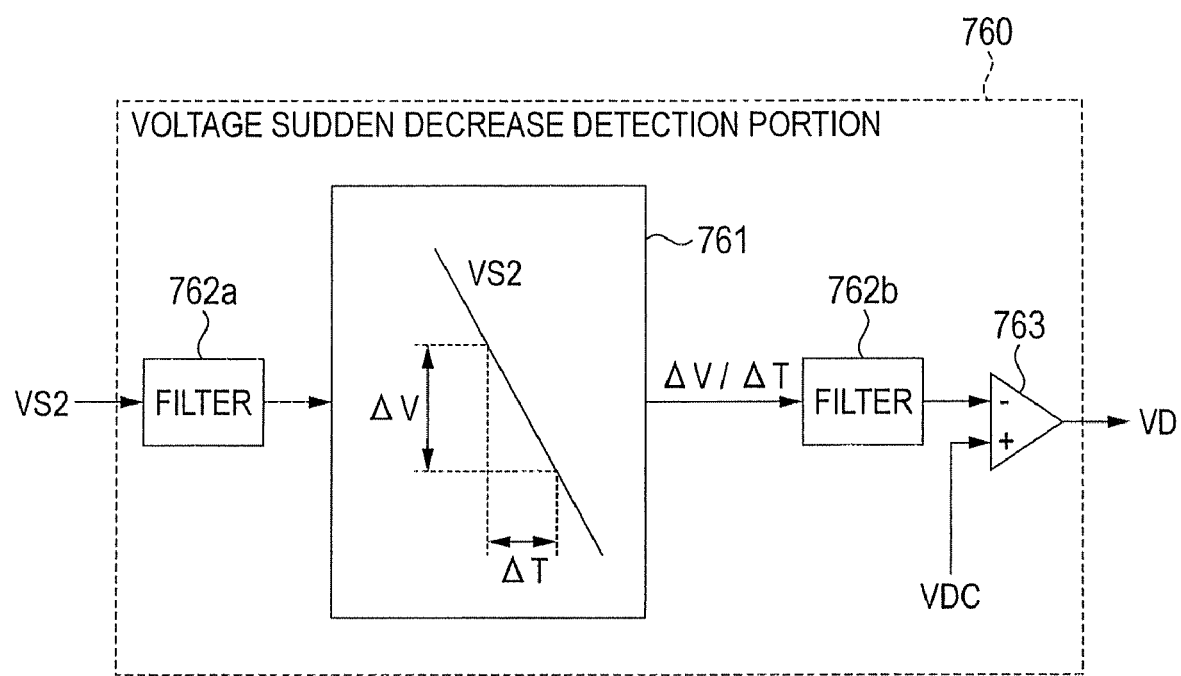
[FIG. 6] It is a diagram showing a configurational example of a voltage sudden decrease detection portion 760 in Embodiment 1 of the invention.
Figure 7:
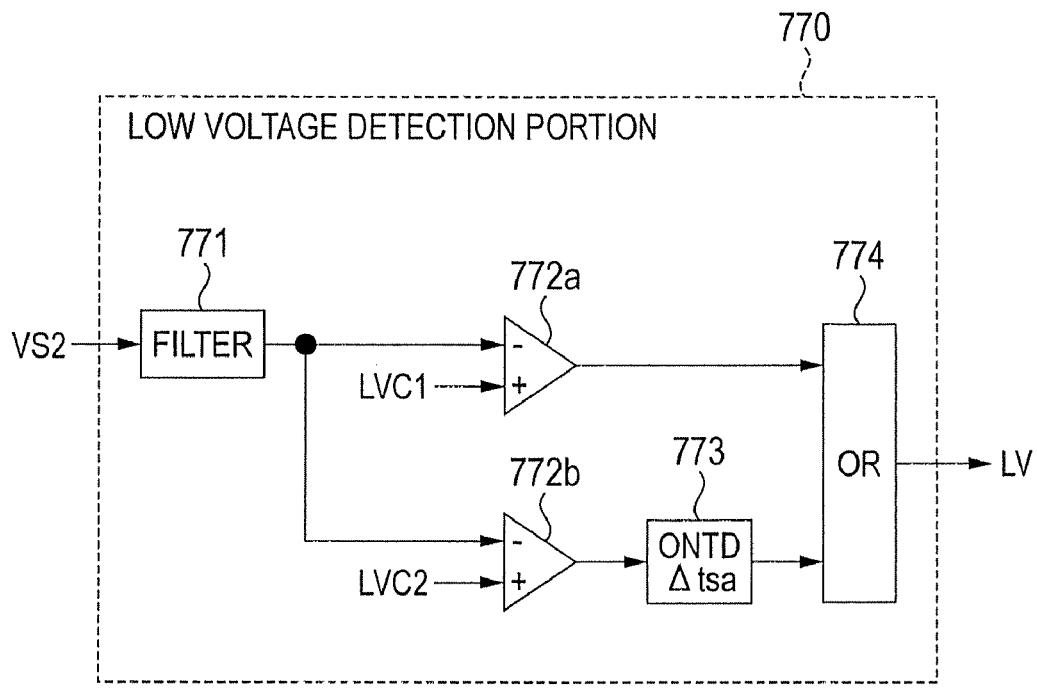
[FIG. 7] It is a diagram showing a configurational example of a low voltage detection portion 770 in Embodiment 1 of the invention.
Figure 8:
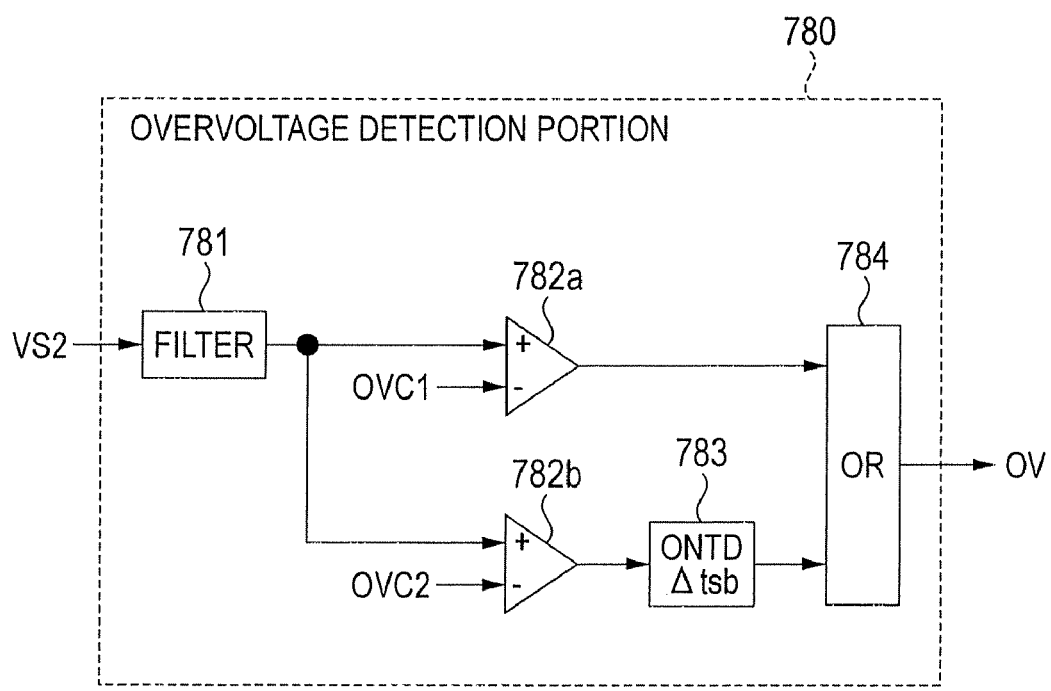
[FIG. 8] It is a diagram showing a configurational example of an overvoltage detection portion 780 in Embodiment 1 of the invention.
Figure 9:
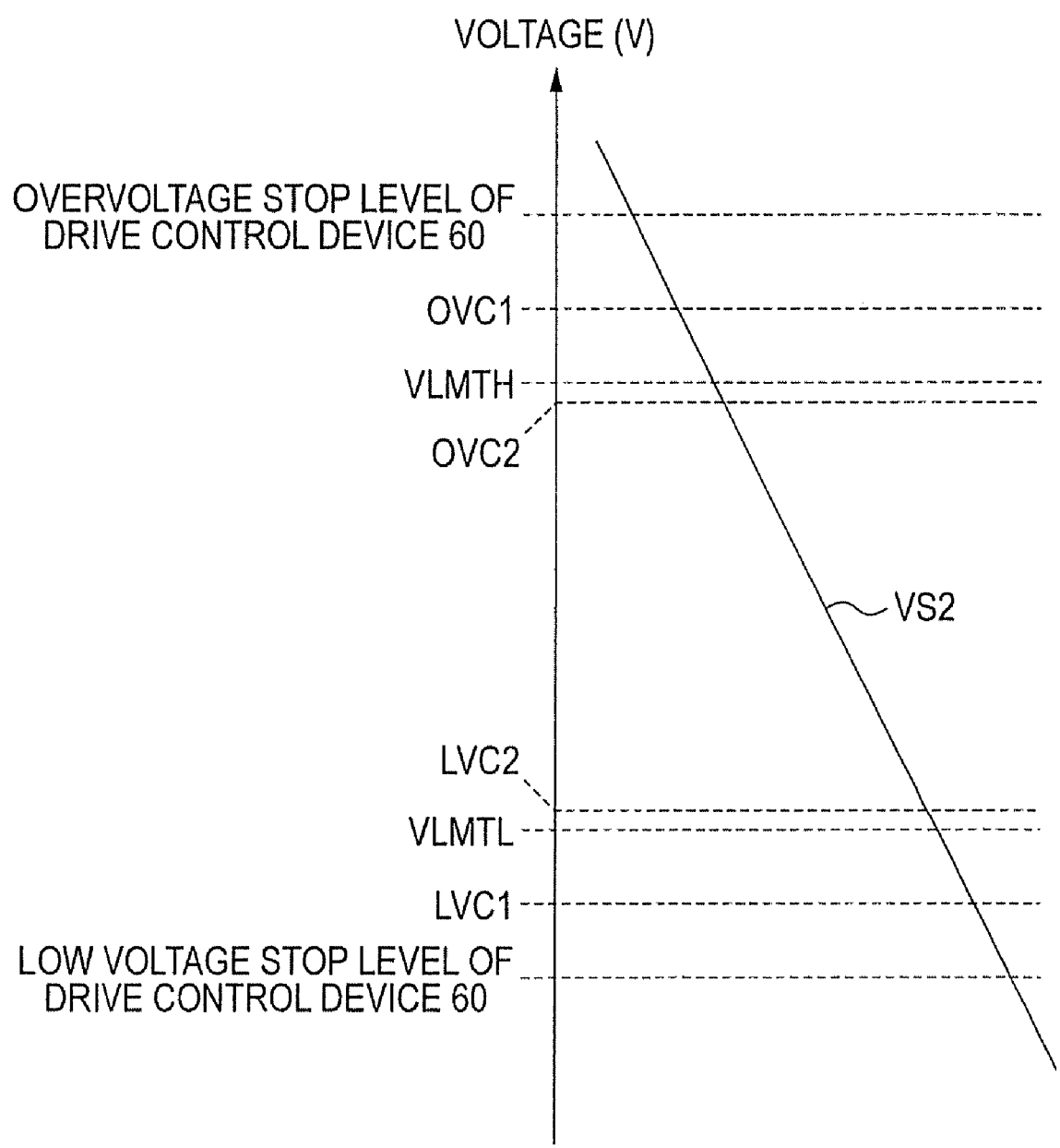
[FIG. 9] It is a diagram for explaining the relationship in Embodiment 1 of the invention, among first and second overvoltage set values OVC1 and OVC2, first and second low voltage set values LVC1 and LVC2, a voltage upper-limit set value VLMTH, a voltage lower-limit set value VLMTL, an overvoltage stop level at which a drive control device 60 is stopped by sensing an overvoltage, and a low voltage stop level at which the drive control device 60 is stopped by sensing a low voltage.
Figure 10A:
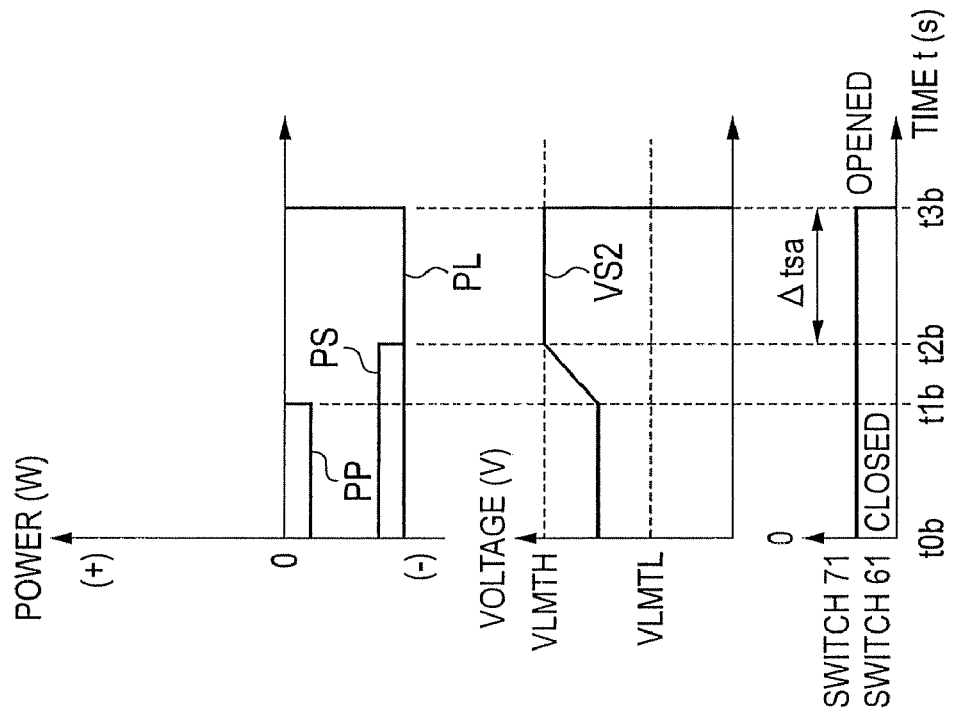
[FIG. 10] It is a diagram for explaining an operation on the occasion of an overhead-line service interruption in Embodiment 1 of the invention.
Figure 10B:
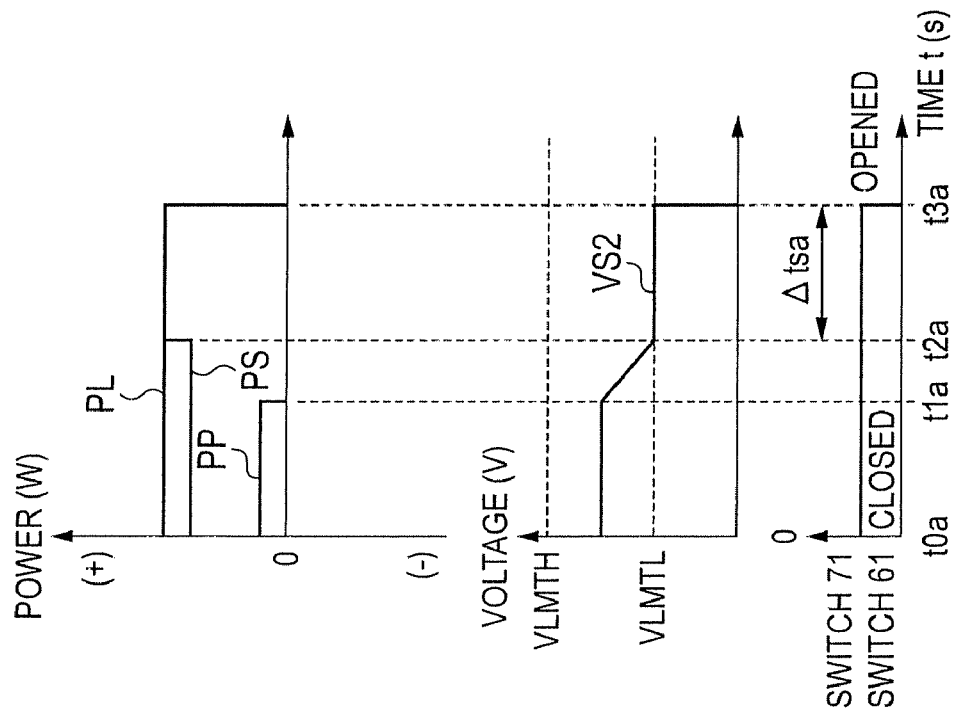
Figure 11:
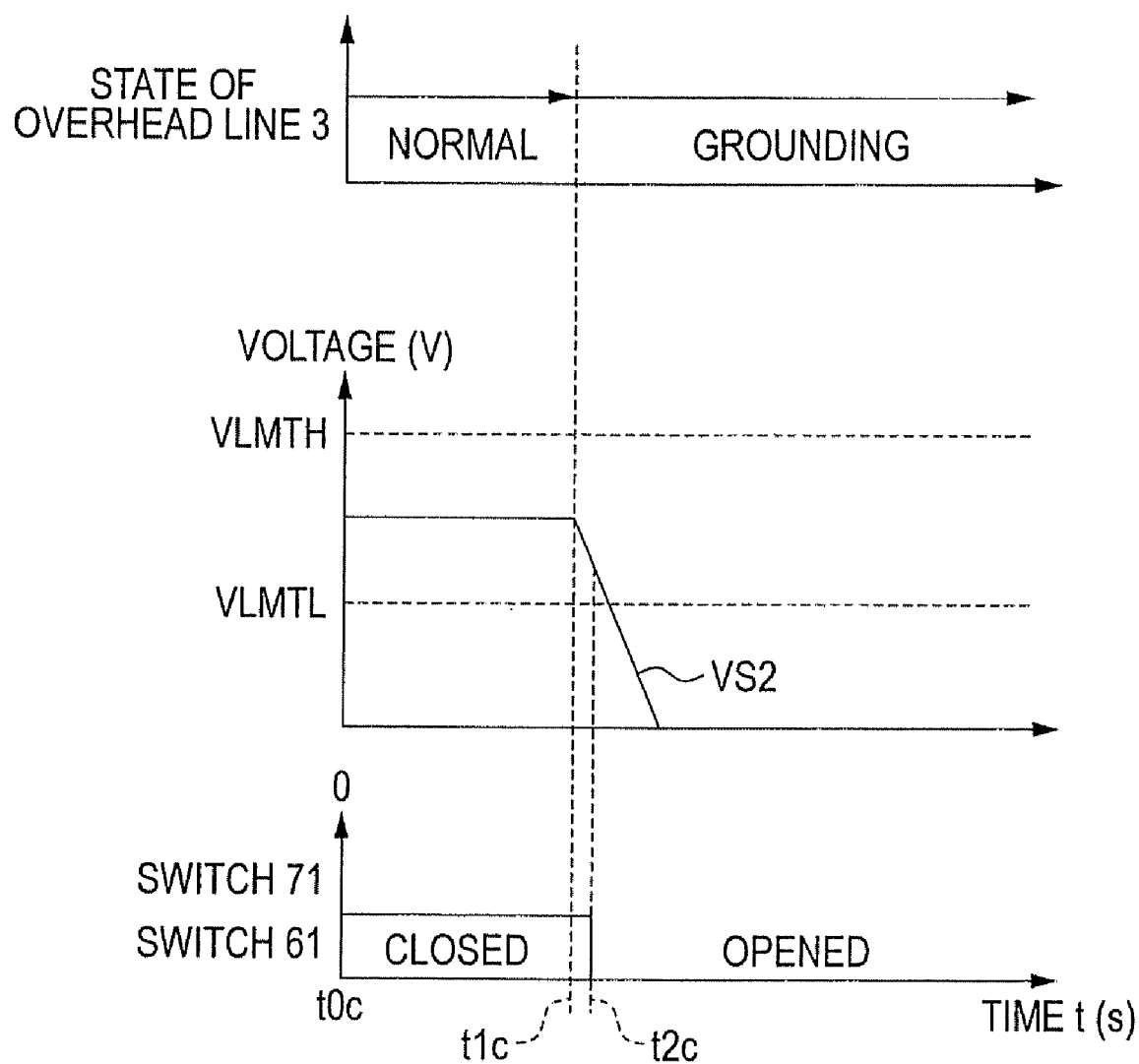
[FIG. 11] It is a diagram for explaining an operation on the occasion of overhead-line grounding in Embodiment 1 of the invention.
Figure 12:
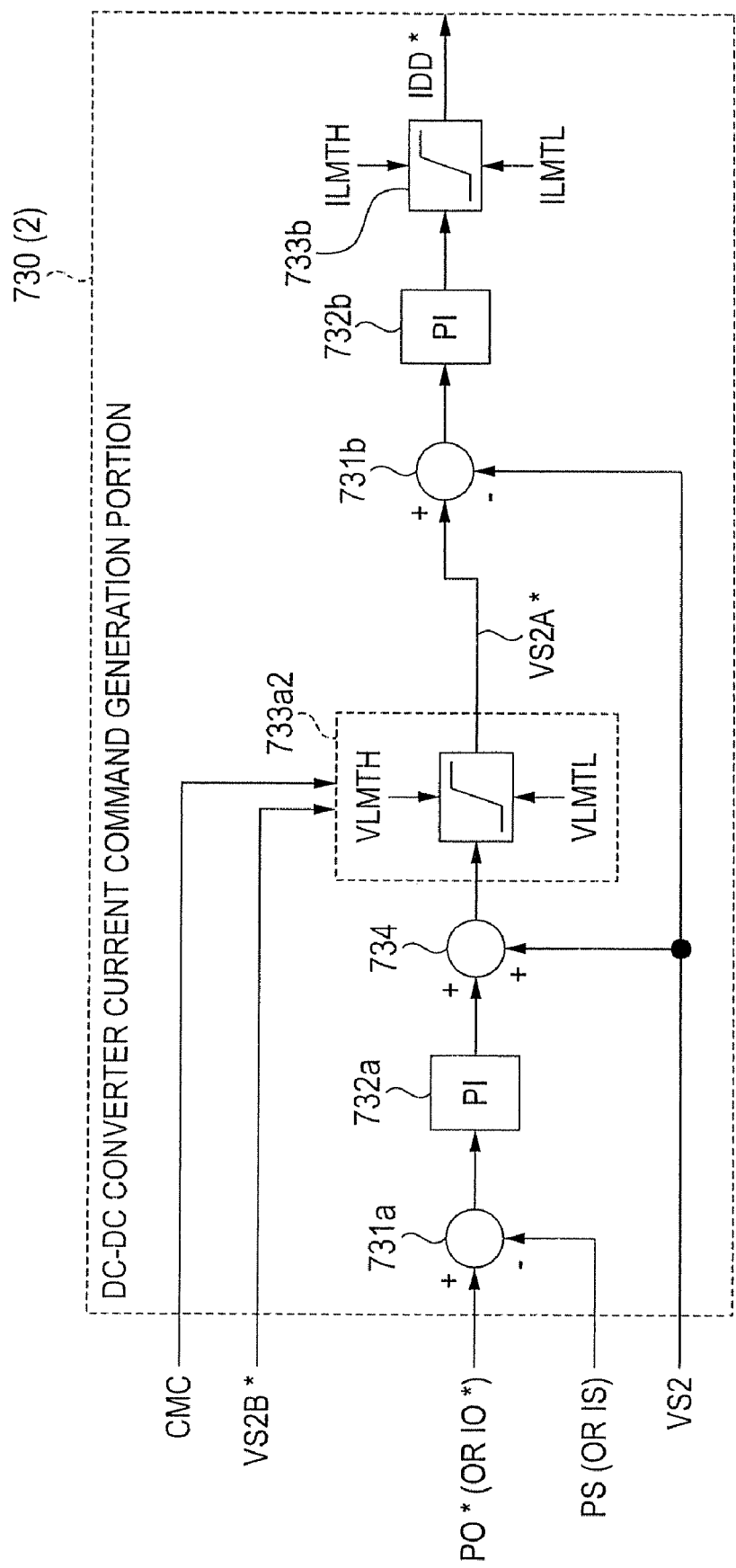
[FIG. 12] It is a diagram showing a configurational example of a DC-DC converter current command generation portion 730(2) in Embodiment 2 of the invention.
Figure 13:
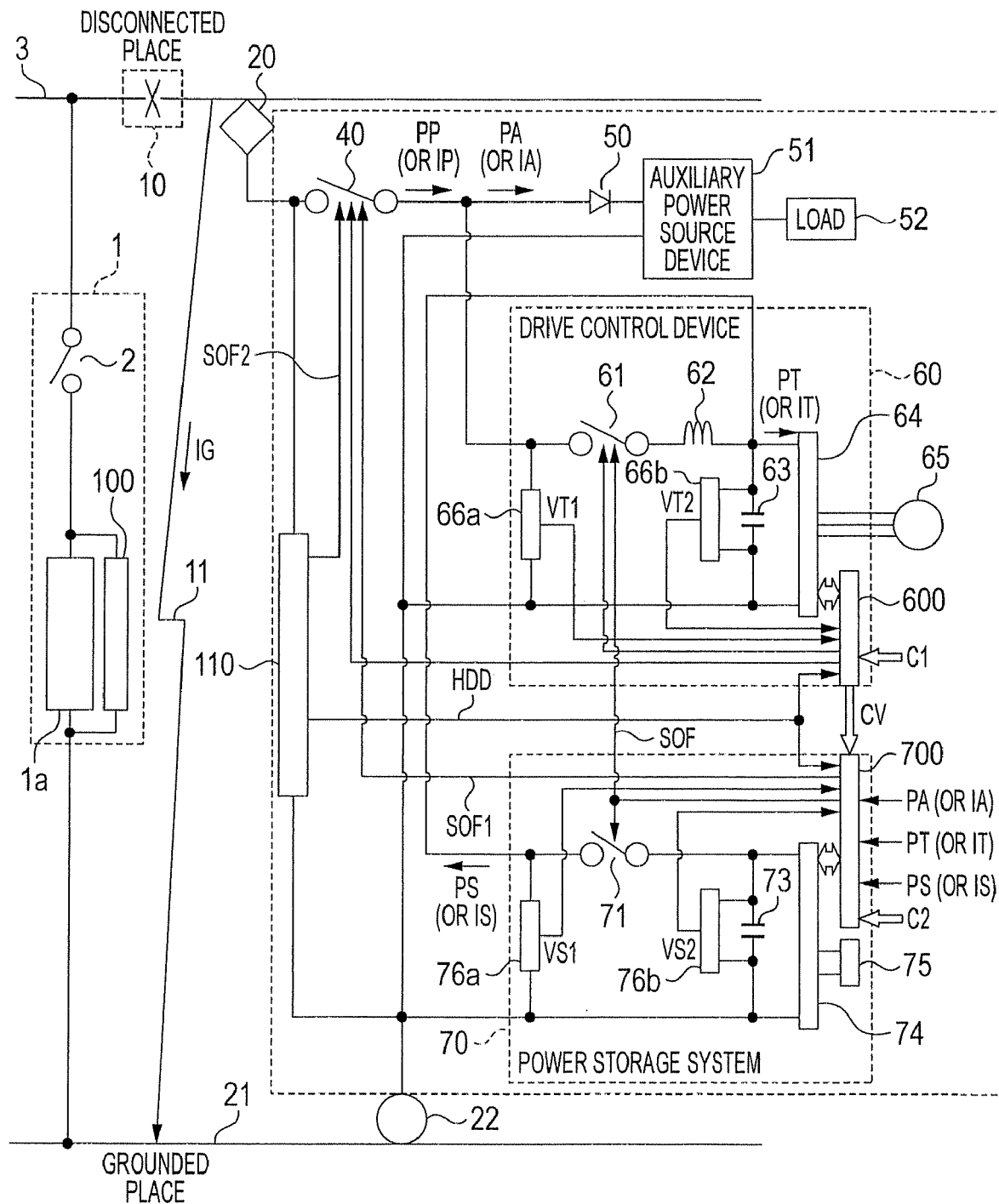
[FIG. 13] It is a diagram showing a configurational example of a control apparatus for an electric car in Embodiment 3 of the invention.
Figure 14:
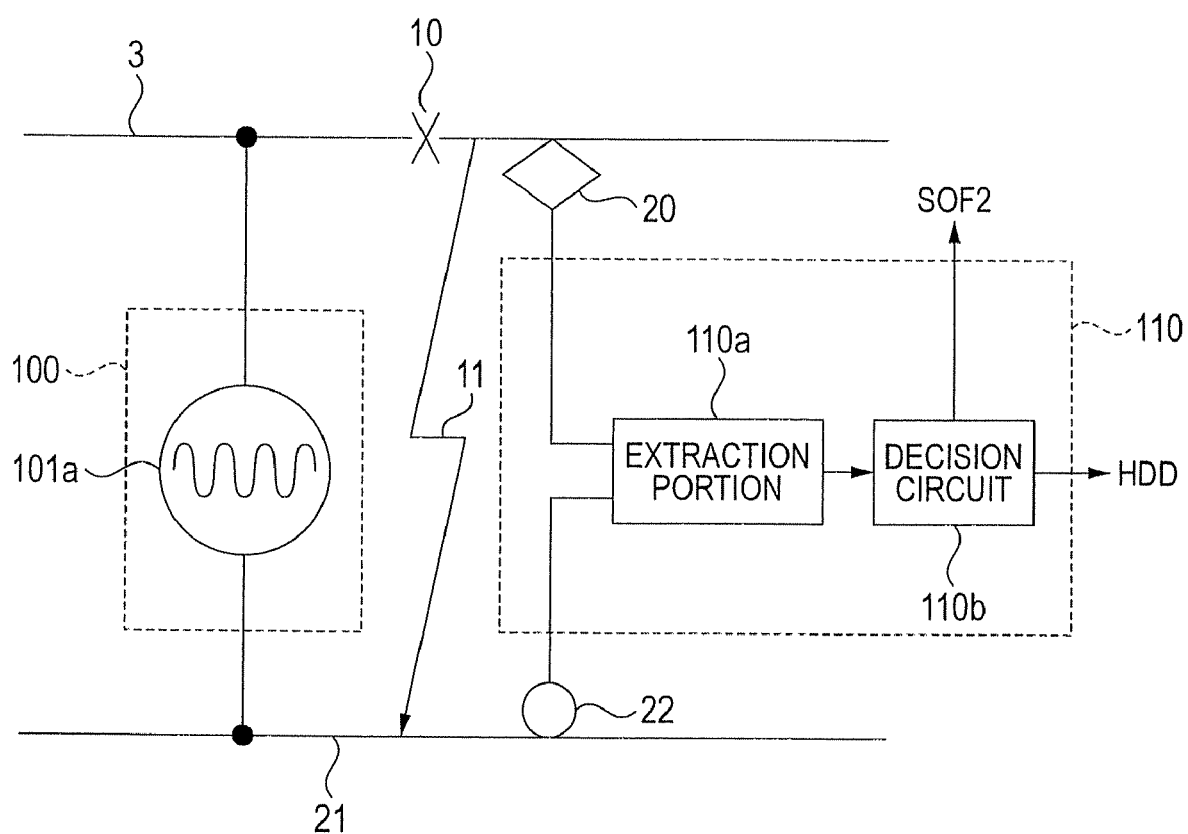
[FIG. 14] It is a diagram for explaining a configurational example and the operation of Embodiment 3 of the invention.

1: substation, 1a: voltage source, 2: switch, 3: overhead line, 10: disconnected place, 11: grounding path, 12: impedance, 20: current collector, 21: rail, 22: wheel, 40: general switch, 50: diode, 51: auxiliary power source device, 52: load, 60: drive control device, 61: switch, 62: reactor, 63: capacitor, 64: drive control inverter, 65: driving motor, 66a, 66b: voltage detectors, 70: power storage system, 71: switch, 73: capacitor, 74: DC-DC converter, 74a-74d: switching elements, 74e: coupling reactor, 74f: capacitor, 74g: reactor, 74h, 74i: switching elements, 74j: reactor, 75: power storage portion, 76a, 76b: voltage detectors, 100: signal generation portion, 101a: signal source, 110: signal detection portion, 110a: extraction portion, 110b: decision circuit, 600: drive control portion, 700: power-storage-system control portion, 710a, 710b: command reception and distribution portion, 720: absorption/emission command generation portion, 723a: power burden proportion command generation portion, 724: multiplier, 730(1), 730(2): DC-DC converter current command generation portions, 731a, 731b: subtracters, 732a, 732b: proportional-integral controllers, 734: adder, 733a1: voltage limiter, 733b: current limiter, 735: switch, 731b: subtracter, 740: DC-DC converter control portion, 750: voltage command generation portion, 760: voltage sudden decrease detection portion, 761: voltage decrement calculation portion, 762a, 762b: filters, 763: comparator, 770: low voltage detection portion, 771: filter, 772a, 772b: comparators, 773: delay circuit, 774: logical sum circuit, 780: overvoltage detection portion, 781: filter, 782a, 782b: comparators, 783: delay circuit, 784: logical sum circuit, 790: logical sum circuit.

The invention claimed is:

1. In a control apparatus for an electric car, wherein an auxiliary power source device for feeding electric power to a load, a drive control device for controlling a driving motor, and a power storage system having a power storage device are connected in a parallel relationship;

a control apparatus for an electric car, wherein the power storage system comprises:

a DC-DC converter connected in parallel with a capacitor;

a voltage detector which detects a voltage of the capacitor;

a power storage portion which has a power storage device for exchanging electric power with said DC-DC converter; and a power storage system control portion which controls said DC-DC converter so that either electric power or a current to be absorbed/emitted by the power storage system, or the voltage of the capacitor becomes a predetermined value, wherein, in a case where said control apparatus for the electric car exchanges electric power with an external device, said power storage system control portion performs a control so that the electric power or the current to be absorbed/emitted by the power storage system does not agree with a sum between electric power or a current of the drive control device and the electric power or a current of the auxiliary power source device.

2. A control apparatus for an electric car as defined in claim 1, further comprising at least one switch which disconnects the drive control device and the power storage system from an overhead line, wherein in a case where the voltage of the capacitor has decreased suddenly, said power storage system control portion detects the sudden decrease to open the switch and to maintain an open state until the switch is reset.

3. A control apparatus for an electric car as defined in claim 1, further comprising at least one switch which disconnects the drive control device and the power storage system from an overhead line, wherein in a case where the voltage of the capacitor has lowered to, at most, a predetermined value, said power storage system control portion detects the lowering to open the switch.

4. A control apparatus for an electric car as defined in claim 1, further comprising at least one switch which disconnects the drive control device and the power storage system from an overhead line, wherein in a case where the voltage of the capacitor has increased to, at least, a predetermined value, said power storage system control portion detects the increase to open the switch.

5. A control apparatus for an electric car as defined in claim 1, wherein a signal generation portion is disposed in a substation which feeds electric power to said control apparatus for the electric car, and a signal detection portion which receives a signal generated by said signal generation portion is mounted on the electric car on which said control apparatus for the electric car is installed.

6. A control apparatus for an electric car as defined in claim 1, wherein, in a case where said control apparatus for the electric car does not exchange electric power with the external device, said power storage system control portion performs the control so that the electric power or the current to be absorbed/emitted by the power storage system agrees with the sum between the electric power or the current of the drive control device and the electric power or the current of the auxiliary power source device.

7. A control apparatus for an electric car as defined in claim 1, wherein, in a case where said control apparatus for the electric car does not exchange electric power with the external device, said power storage system control portion controls said DC-DC converter so that the voltage of the capacitor becomes a predetermined value.

8. A control apparatus for an electric car as defined in claim 1, wherein, in a case where said control apparatus for the electric car does not exchange electric power with the external device, said power storage system control portion controls a current of said DC-DC converter on the basis of a current command value which is determined so that the voltage of the capacitor becomes a predetermined value.

9. A control apparatus for an electric car as defined in claim 1, wherein, in a case where said control apparatus for the electric car is exchanging electric power with the external device and where the voltage of the capacitor is, at least, a predetermined upper-limit value or, at most, a predetermined lower-limit value, said power storage system control portion performs the control so that electric power or the current to be absorbed/emitted by the power storage system agrees with the sum between the electric power or the current of the drive control device and the electric power or the current of the auxiliary power source device.

10. A control apparatus for an electric car as defined in claim 1, wherein, in a case where said control apparatus for the electric car exchanges electric power with the external device, said power storage system control portion controls a current of said DC-DC converter on the basis of a current command value calculated using a value which is calculated on the basis of the sum between the electric power or the current of the drive control device and the power or the current of the auxiliary power source device and whose upper and lower limits are set.

11. A control apparatus for an electric car as defined in claim 1, comprising at least one switch which disconnects the drive control device and the power storage system from an overhead line, wherein said power storage system control portion compares the voltage of the capacitor with a first overvoltage set value and with a second overvoltage set value which is set lower than the first overvoltage set value, and opens said switch in a case where a state in which the voltage of the capacitor is, at least, the second overvoltage set value and has continued for a predetermined time period, or in a case where the voltage of the capacitor has become, at least, the first overvoltage set value.

12. A control apparatus for an electric car as defined in claim 11, wherein the first overvoltage set value is a value which is lower than an overvoltage stop level of the drive control device.

13. A control apparatus for an electric car as defined in claim 1, comprising a switch which disconnects the drive control device and the power storage system from an overhead line, wherein said power storage system control portion compares the voltage of the capacitor with a first low voltage set value and with a second low voltage set value which is set higher than the first low voltage set value, and opens said switch in a case where a state in which the voltage of the capacitor is, at most, the second low voltage set value and has continued for a predetermined time period, or in a case where the voltage of the capacitor has become, at most, the first low voltage set value.

14. A control apparatus for an electric car as defined in claim 13, wherein the first low voltage set value is a value which is higher than a low voltage stop level of the drive control device.

15. A control apparatus for an electric car as defined in claim 1, wherein said power storage system control portion includes a first overvoltage set value, a voltage upper-limit set value which is set lower than the first overvoltage set value, a second overvoltage set value which is set lower than the voltage upper-limit set value, a first low voltage set value, a voltage lower-limit set value which is set higher than the first low voltage set value, and a second low voltage set value which is set higher than the voltage lower-limit set value and lower than the second overvoltage set value, and wherein said control portion performs a control so as to maintain the voltage of the capacitor between the voltage upper-limit set value and the voltage lower-limit set value.

16. A control apparatus for an electric car as defined in claim 1, wherein the electric power or a current of the auxiliary power source device is made zero.

17. In a control apparatus for an electric car, wherein an auxiliary power source device for feeding electric power to a load, a drive control device for controlling a driving motor, and a power storage system having a power storage device are connected in a parallel relationship;
   a control apparatus for an electric car, wherein the power storage system comprises:
   a DC-DC converter connected in parallel with a capacitor;
   a voltage detector which detects a voltage of the capacitor;
   a power storage portion which has a power storage device for exchanging electric power with said DC-DC converter; and
   a power storage system control portion which controls said DC-DC converter so that either electric power or a current to be absorbed/emitted by the power storage system, or the voltage of the capacitor becomes a predetermined value, wherein said power storage system control portion comprises:
   a command reception and distribution portion which generates a control mode command corresponding to a running command input from an external source;
   an absorption/emission command generation portion which generates a basic power command value or a basic current command value on the basis of at least one signal of a rotational frequency of the driving motor, an inverter frequency of the drive control device, and a vehicle speed and a sum between electric power or a current of the drive control device and the electric power or a current of the auxiliary power source device;

a voltage command generation portion which generates a second voltage command value being a target value of the voltage of the capacitor;

a DC-DC converter current command generation portion which generates a DC-DC converter current command value on the basis of the control mode command, the basic power command value or basic current command value, the second voltage command value, the electric power or a current of the power storage system, and the voltage of the capacitor; and a DC-DC converter control portion which performs a control of said DC-DC converter so that a current of said DC-DC converter agrees with the DC-DC converter current command value.

18. A control apparatus for an electric car as defined in claim 17, wherein said DC-DC converter current command generation portion includes an adder which adds the voltage of the capacitor and a value which corresponds to a difference between the electric power or the current to be absorbed/emitted by the power storage system and the basic power command value or the basic current command value, a voltage limiter which sets upper and lower limits of an output of said adder, change-over means for changing-over a first voltage command value being an output of said voltage limiter and the second voltage command value in accordance with the control mode command, and a subtracter which subtracts the voltage of the capacitor from an output of said change-over means, and wherein an output of said subtracter is made the DC-DC converter current command value.

19. A control apparatus for an electric car as defined in claim 17, wherein said DC-DC converter current command generation portion includes an adder which adds the voltage of the capacitor and a value which corresponds to a difference between the electric power or the current to be absorbed/emitted by the power storage system and the basic power command value or the basic current command value, a voltage limiter to which an output of said adder and the second voltage value are inputted and which sets upper and lower limits in accordance with the control mode command, and a subtracter which subtracts the voltage of the capacitor from an output of said voltage limiter, and wherein an output of said subtracter is made the DC-DC converter current command value.

20. A control apparatus for an electric car as defined in claim 19, further including a current limiter which sets upper and lower limits of the output of said subtracter, wherein an output of said current limiter is made the DC-DC converter current command value.

21. In a control apparatus for an electric car, wherein an auxiliary power source device for feeding electric power to a load, a drive control device for controlling a driving motor, and a power storage system having a power storage device are connected in a parallel relationship;

a control apparatus for an electric car, wherein the power storage system comprises:

a DC-DC converter connected in parallel with a capacitor;

a voltage detector which detects a voltage of the capacitor;

a power storage portion which has a power storage device for exchanging electric power with said DC-DC converter, a power storage system control portion which controls said DC-DC converter so that either electric power or a current to be absorbed/emitted by the power storage system, or the voltage of the capacitor becomes a predetermined value, and at least one switch which disconnects the drive control device and the power storage system from an overhead line, wherein in a case where one of:

(1) the voltage of the capacitor has decreased suddenly, said power storage system control portion detects the sudden decrease to open the switch and to maintain an open state until the switch is reset, (2) the voltage of the capacitor has lowered to, at most, a predetermined value, said power storage system control portion detects the lowering to open the switch; or (3) the voltage of the capacitor has increased to, at least, the predetermined value, said power storage system control portion detects the increase to open the switch.

* * * * *